Dec. 8, 1959     R. F. ALBRIGHTON ET AL     2,916,613
POSTING INDICATOR CONTROL SYSTEM
Filed Sept. 26, 1956     21 Sheets-Sheet 10

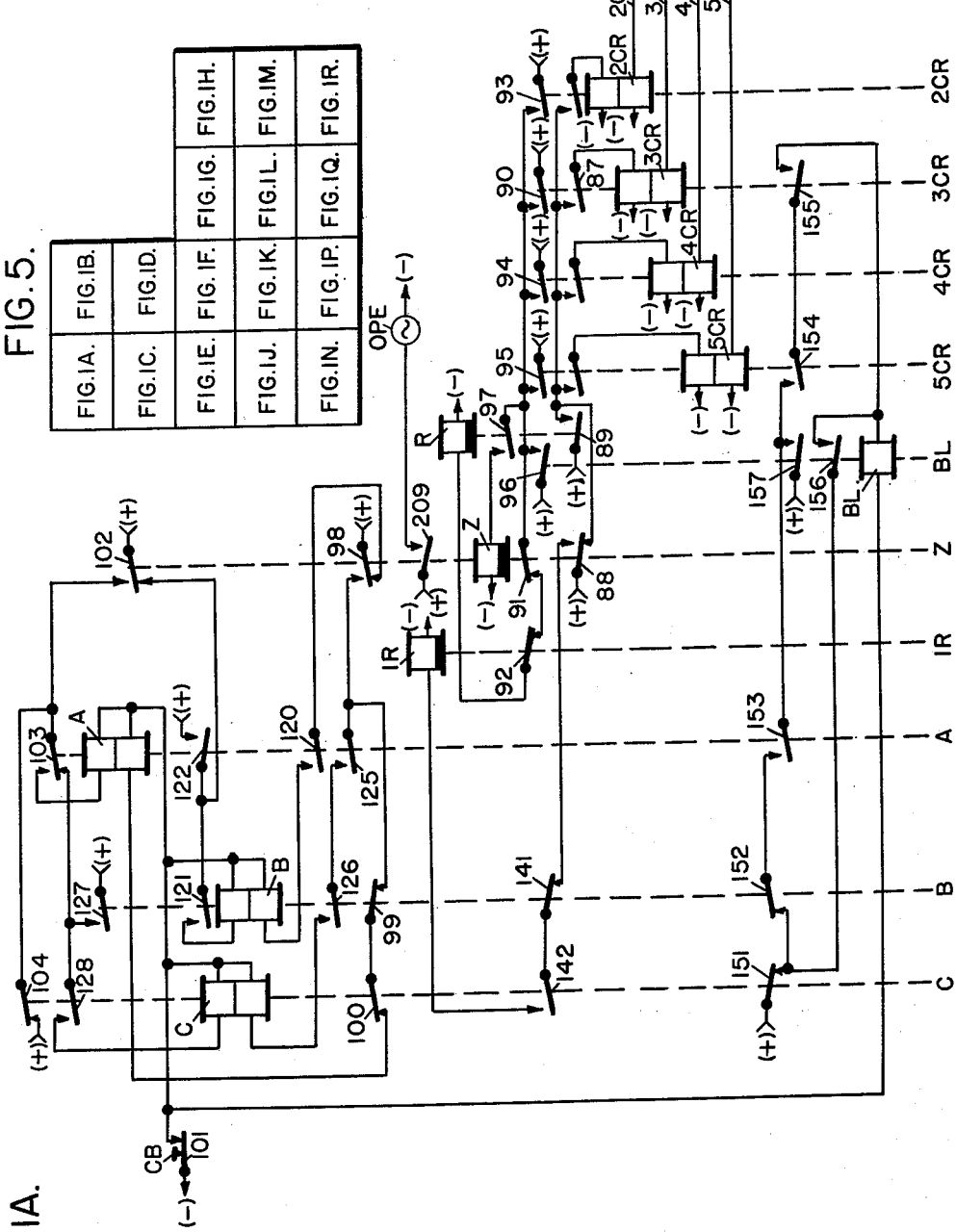
Dec. 8, 1959    R. F. ALBRIGHTON ET AL    2,916,613
POSTING INDICATOR CONTROL SYSTEM
Filed Sept. 26, 1956    21 Sheets-Sheet 1
INVENTORS
R. F. ALBRIGHTON
AND W. R. SMITH
BY
THEIR ATTORNEY Dec. 8, 1959   R. F. ALBRIGHTON ET AL   2,916,613
POSTING INDICATOR CONTROL SYSTEM
Filed Sept. 26, 1956   21 Sheets-Sheet 2
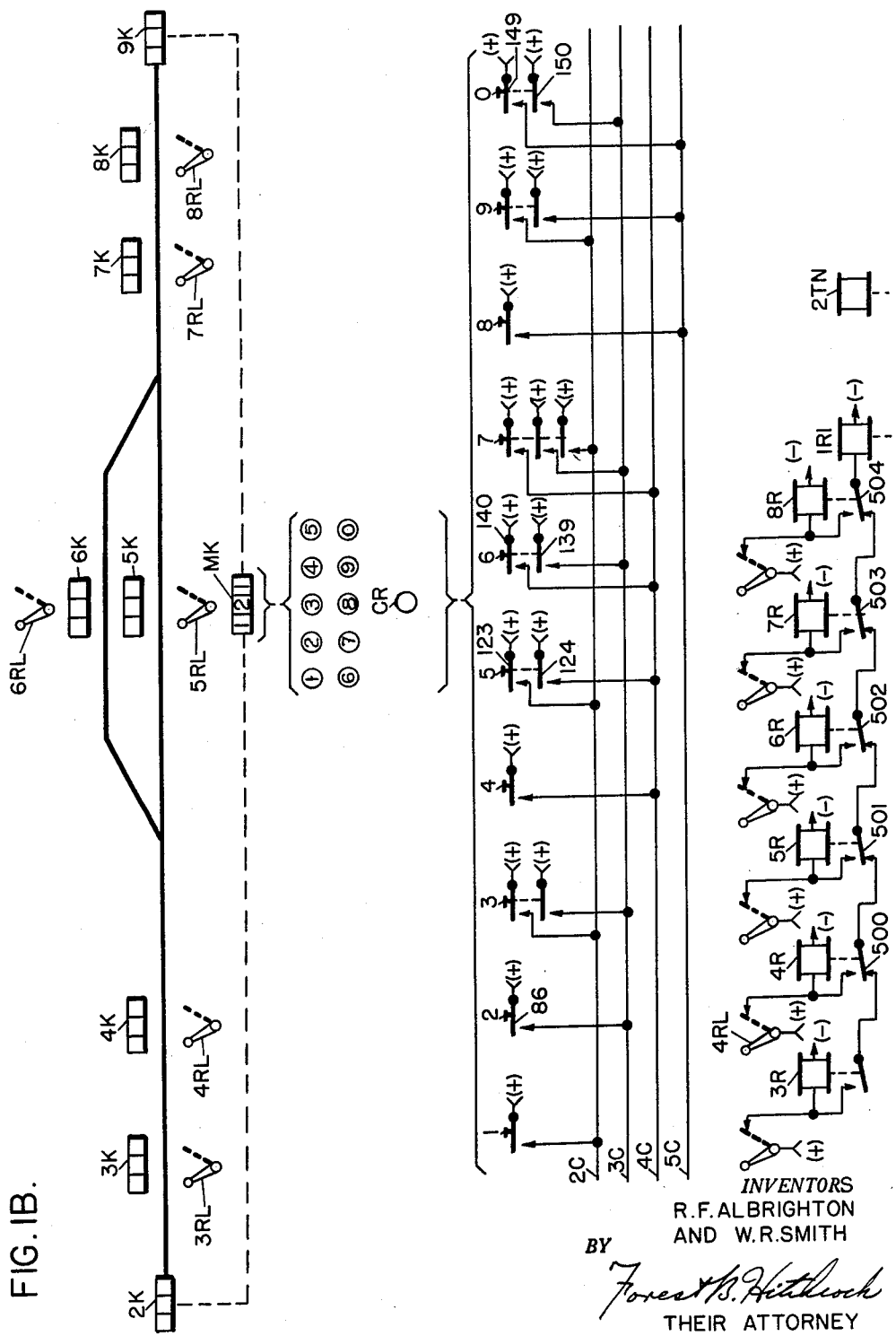
FIG. IB.
INVENTORS
R.F. ALBRIGHTON
AND W.R. SMITH
BY
Forest B. Hitchcock
THEIR ATTORNEY

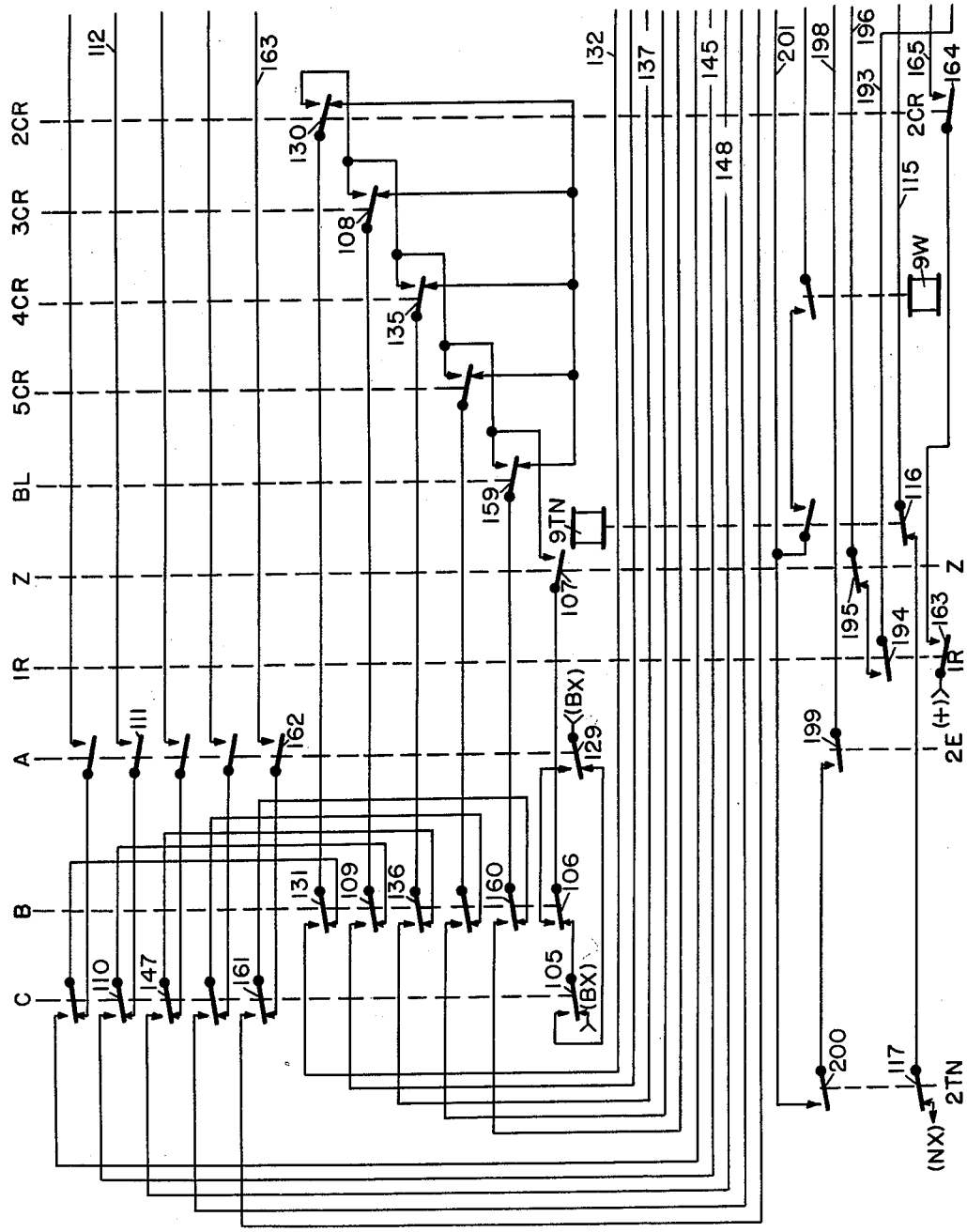
FIG.IC.

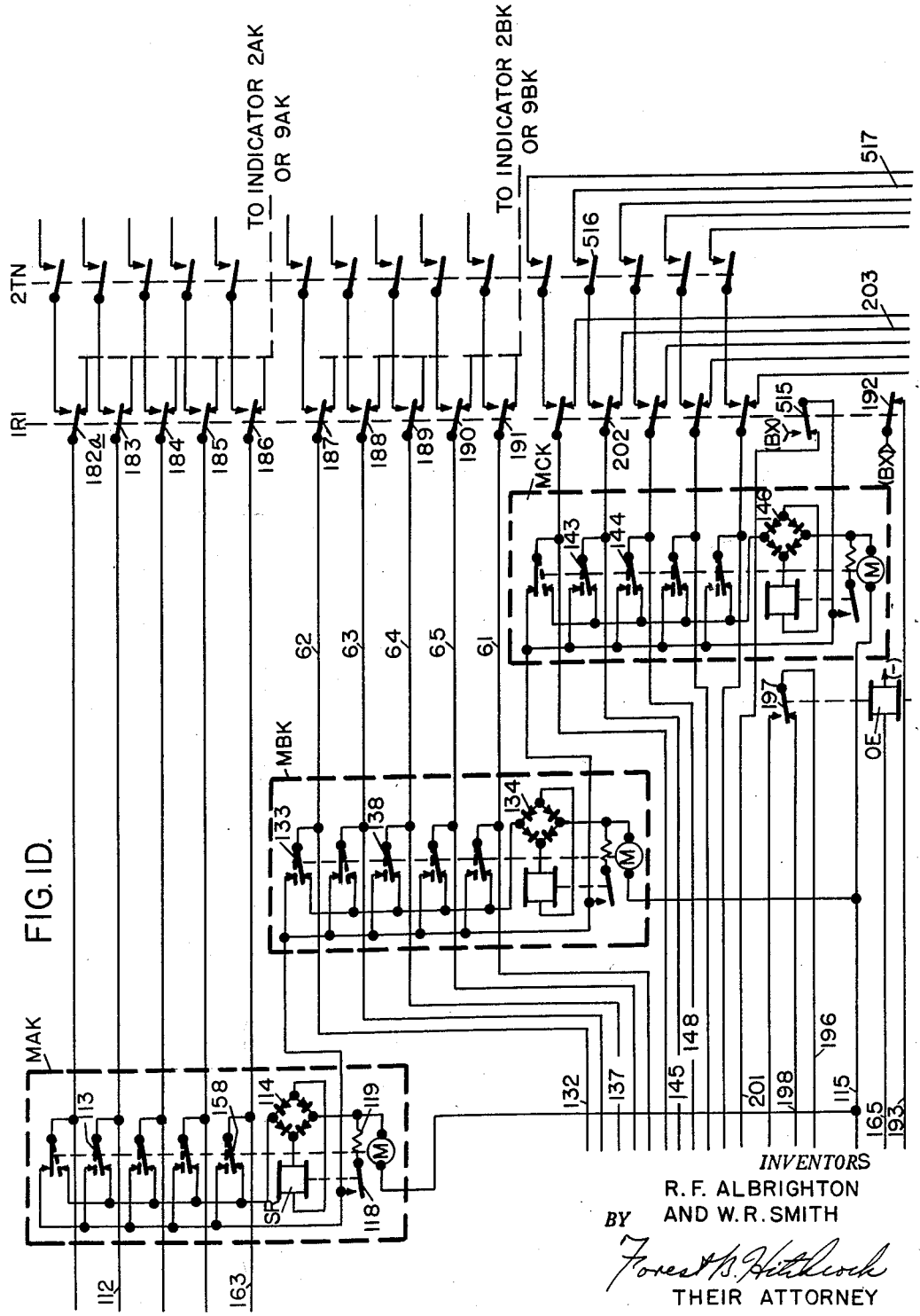

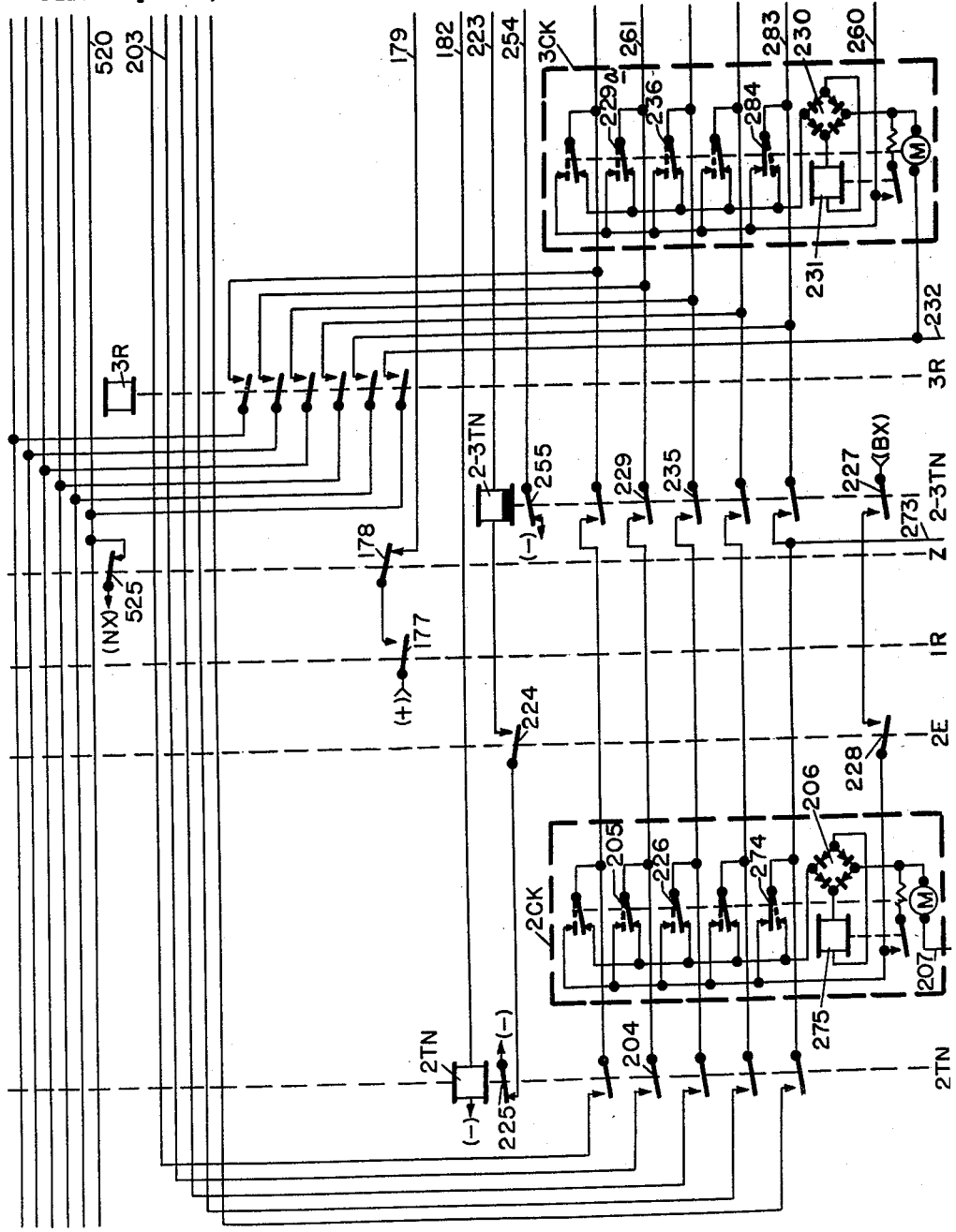

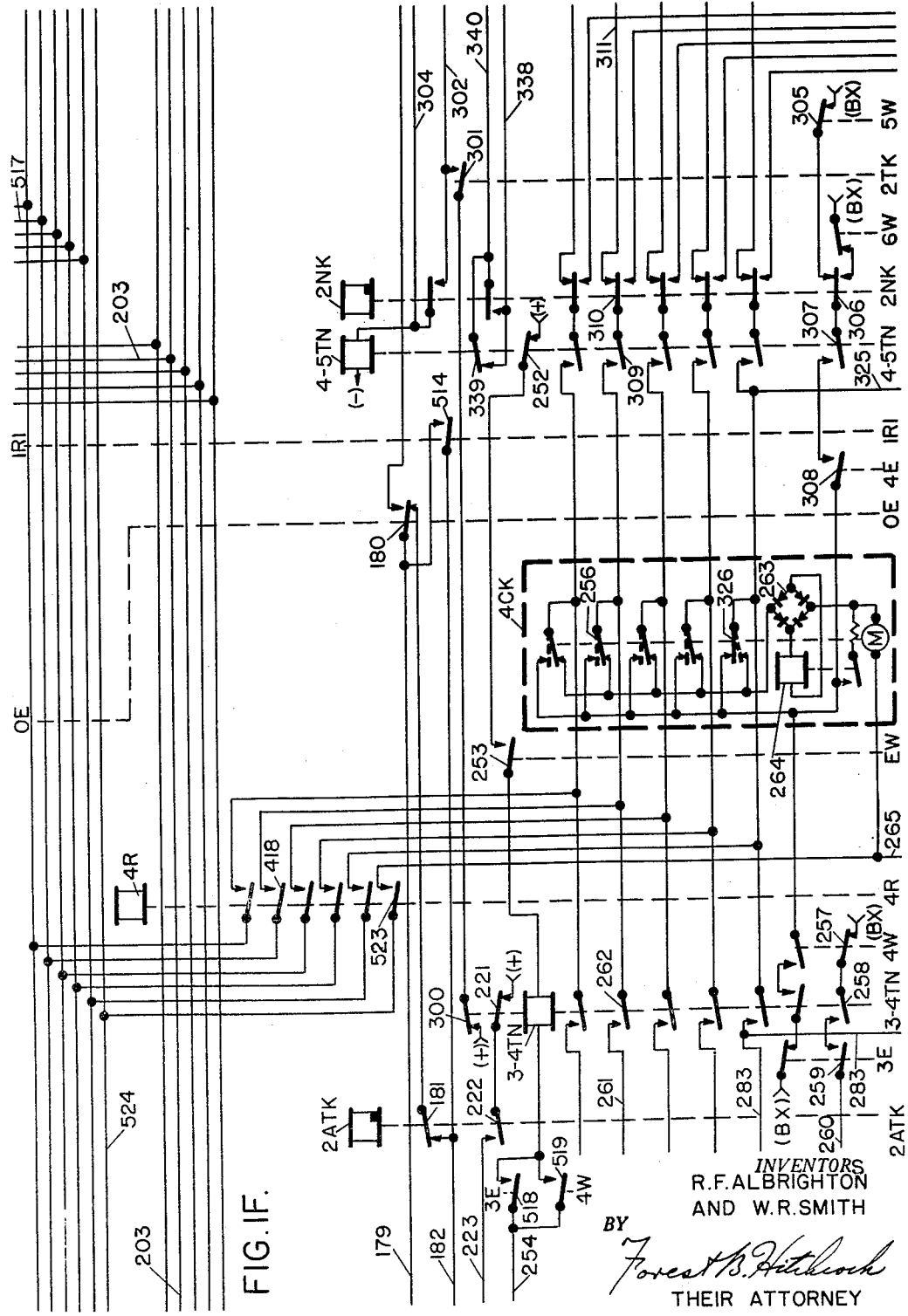

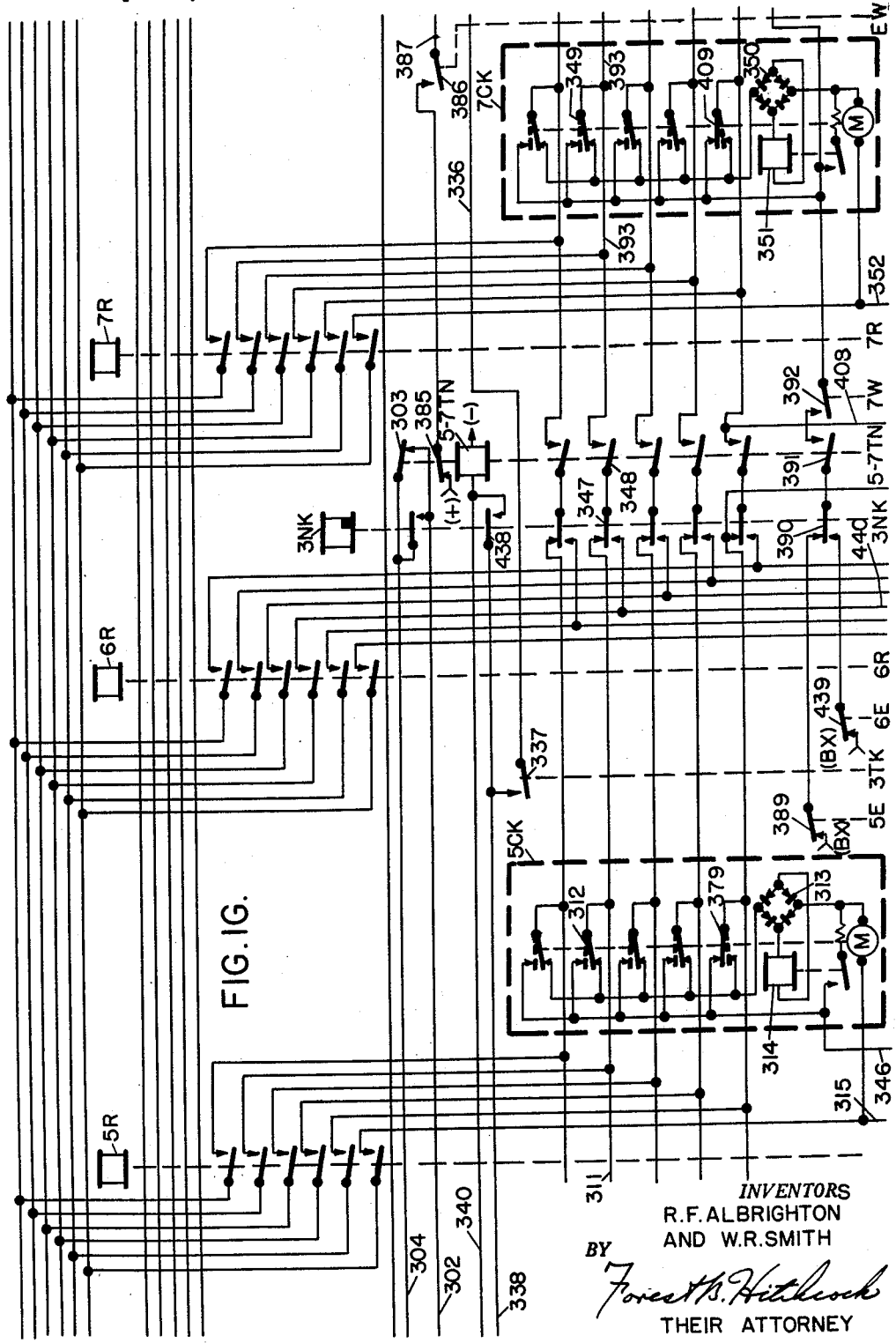

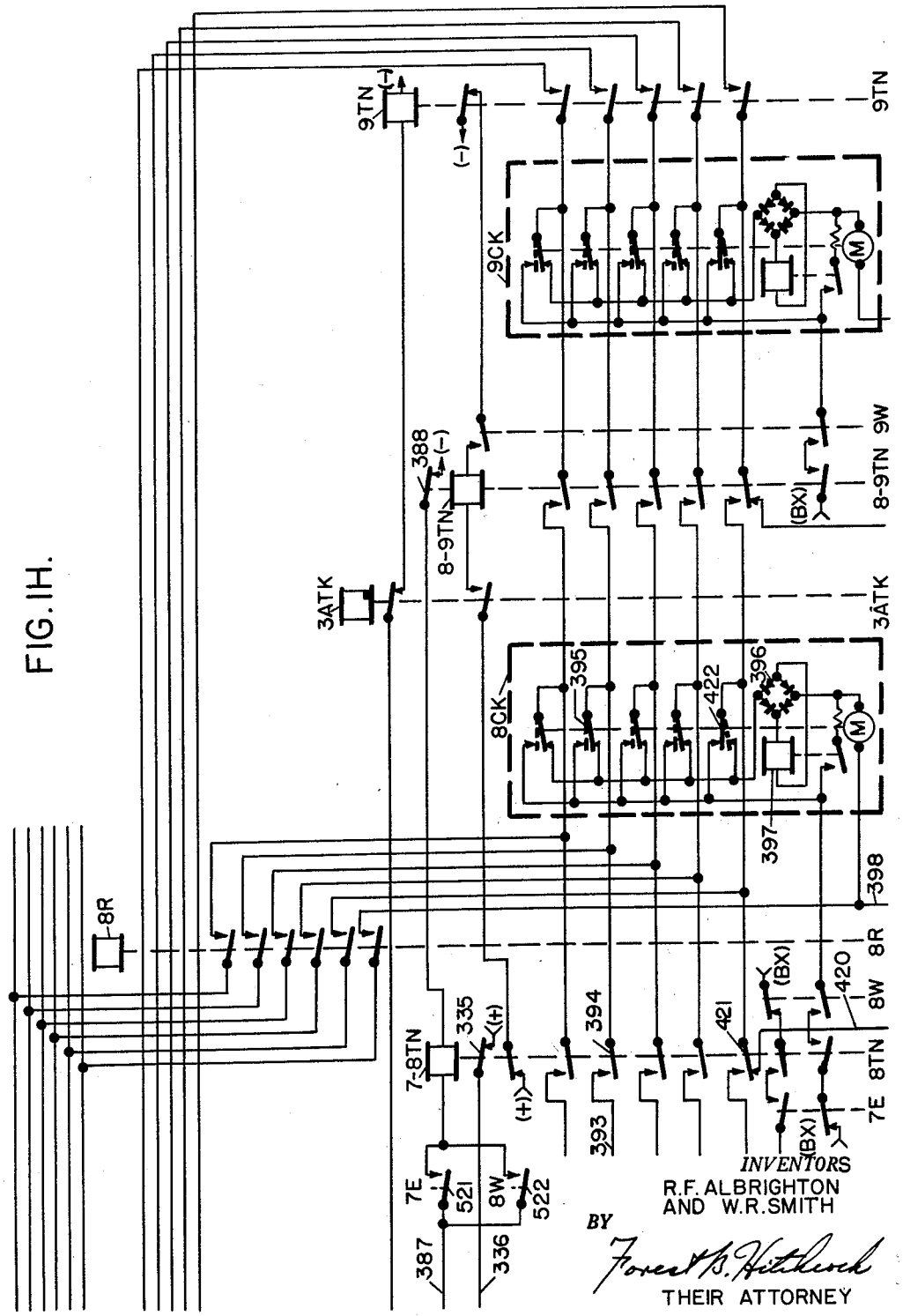

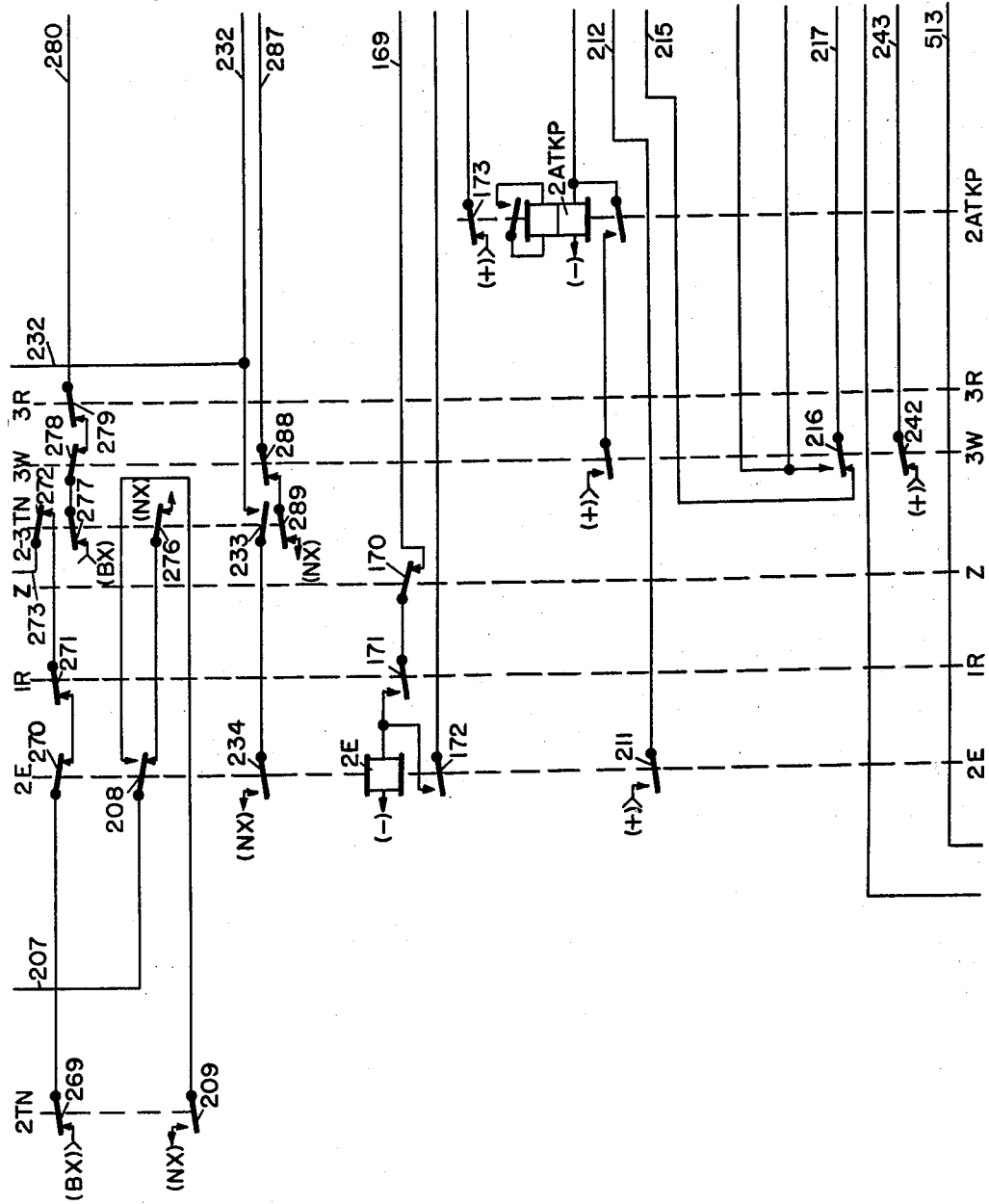

INVENTORS
R. F. ALBRIGHTON
AND W. R. SMITH
BY
*Forest B. Hitchcock*
THEIR ATTORNEY

FIG. IK.

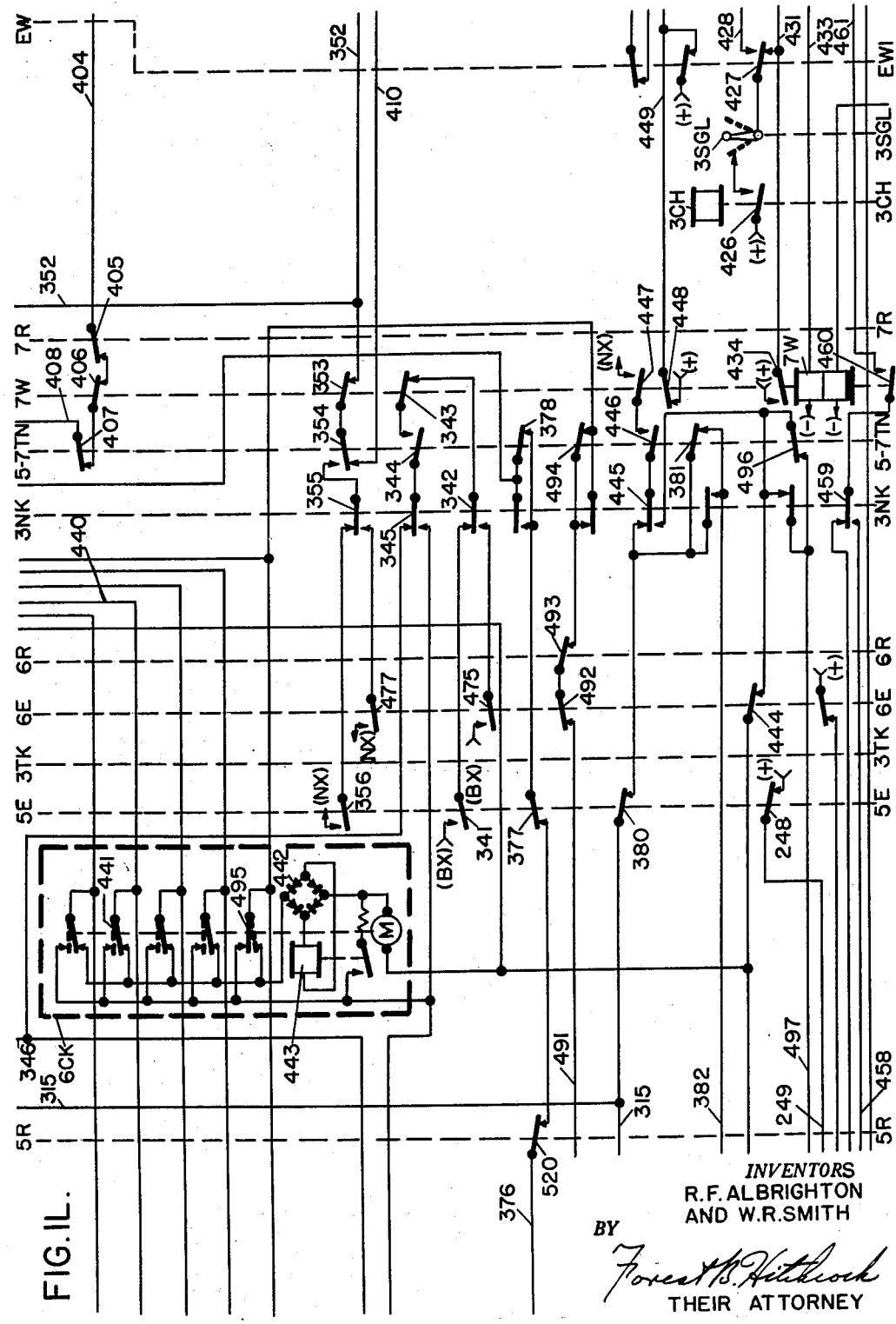

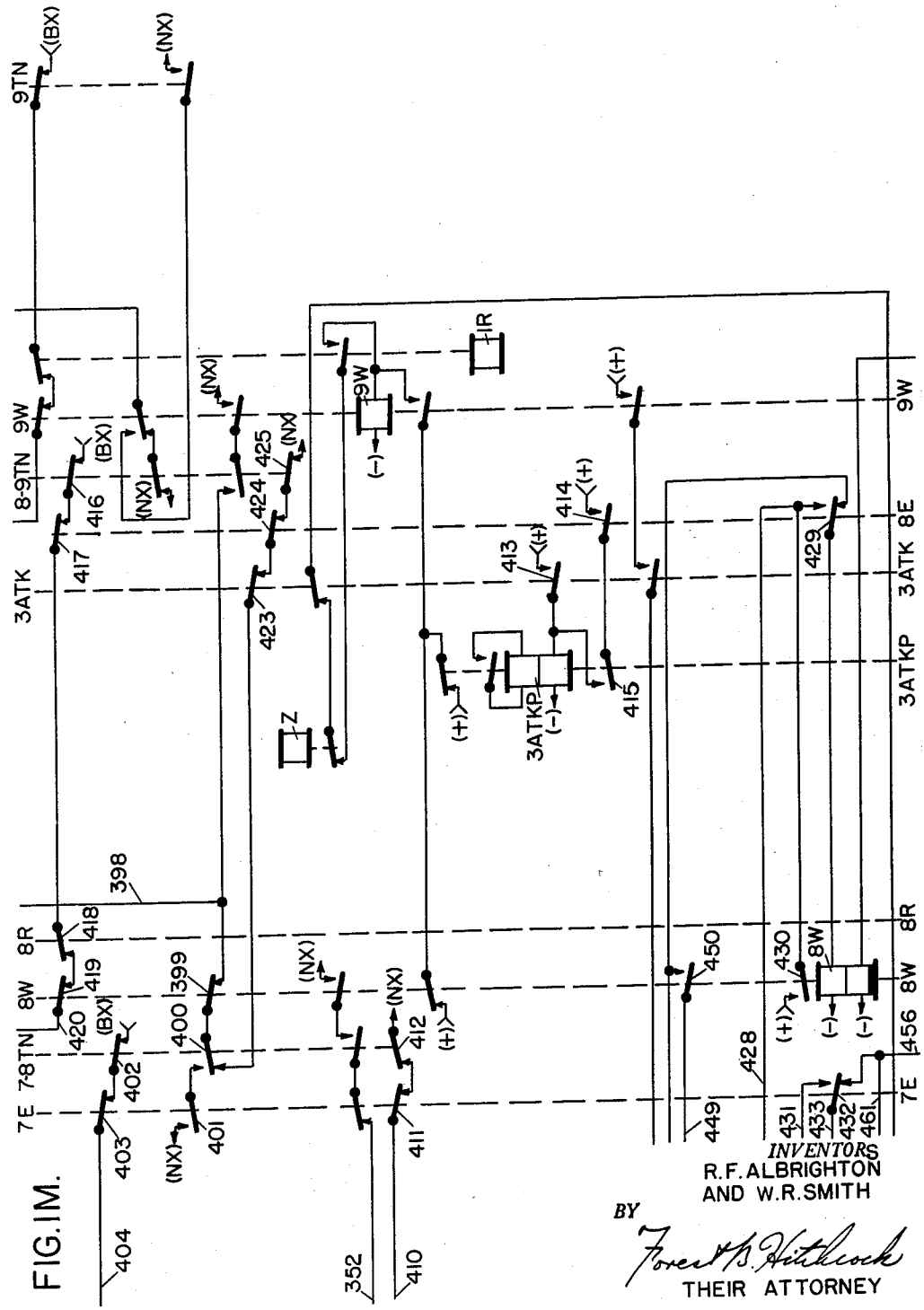

Dec. 8, 1959  R. F. ALBRIGHTON ET AL  2,916,613
POSTING INDICATOR CONTROL SYSTEM
Filed Sept. 26, 1956  21 Sheets-Sheet 13
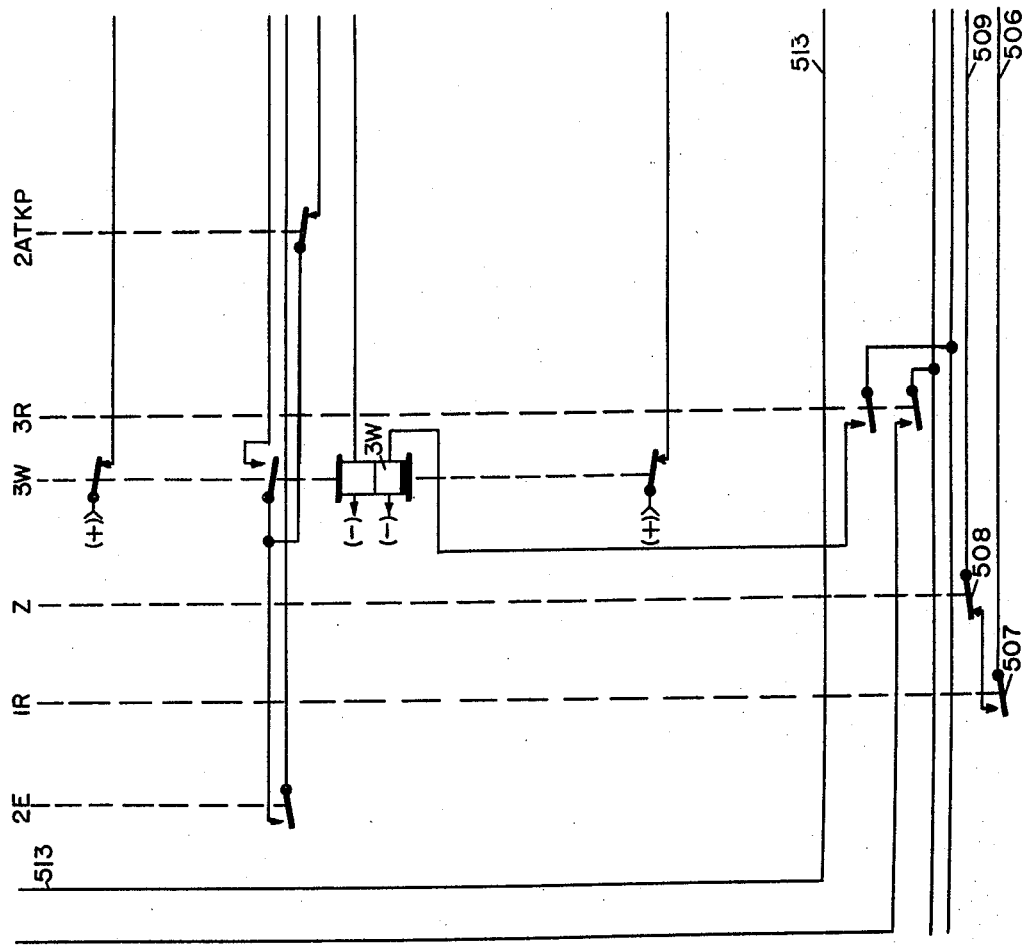
FIG. IN.
INVENTORS
R. F. ALBRIGHTON
AND W. R. SMITH
BY
THEIR ATTORNEY

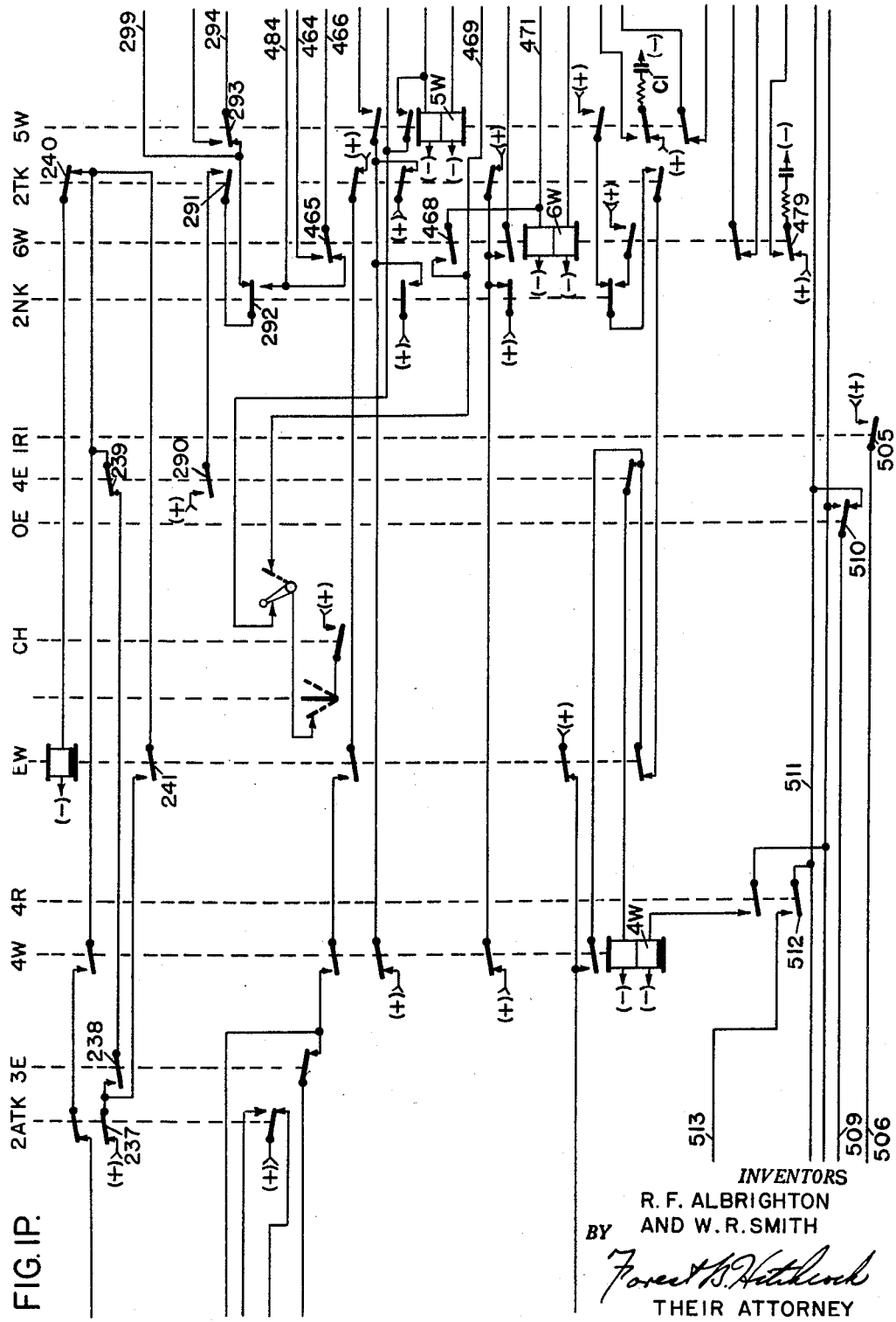

Dec. 8, 1959  R. F. ALBRIGHTON ET AL  2,916,613
POSTING INDICATOR CONTROL SYSTEM
Filed Sept. 26, 1956  21 Sheets-Sheet 15

FIG. IQ.

INVENTORS
R. F. ALBRIGHTON
AND W. R. SMITH
BY
Forest B. Hitchcock
THEIR ATTORNEY Dec. 8, 1959　　　R. F. ALBRIGHTON ET AL　　　2,916,613
POSTING INDICATOR CONTROL SYSTEM
Filed Sept. 26, 1956　　　　　　　　　　　　21 Sheets-Sheet 16

FIG. IR.

INVENTORS
R. F. ALBRIGHTON
AND W. R. SMITH
BY
THEIR ATTORNEY

Dec. 8, 1959    R. F. ALBRIGHTON ET AL    2,916,613
POSTING INDICATOR CONTROL SYSTEM

Filed Sept. 26, 1956    21 Sheets-Sheet 17

FIG. 3.

CODE TABLE

| CODE NO. | CODE DIGIT NO'S | | | | |
|---|---|---|---|---|---|
| | 1 | 2 | 3 | 4 | 5 |
| 1 | M | M | M | M | M |
| 2 | S | M | M | M | M |
| 3 | M | S | M | M | M |
| 4 | S | S | M | M | M |
| 5 | M | M | S | M | M |
| 6 | S | M | S | M | M |
| 7 | M | S | S | M | M |
| 8 | S | S | S | M | M |
| 9 | M | M | M | S | M |
| 10 | S | M | M | S | M |
| 11 | M | S | M | S | M |
| 12 | S | S | M | S | M |
| 13 | M | M | S | S | M |
| 14 | S | M | S | S | M |
| 15 | M | S | S | S | M |
| 16 | S | S | S | S | M |
| 17 | M | M | M | M | S |
| 18 | S | M | M | M | S |
| 19 | M | S | M | M | S |
| 20 | S | S | M | M | S |
| 21 | M | M | S | M | S |
| 22 | S | M | S | M | S |
| 23 | M | S | S | M | S |
| 24 | S | S | S | M | S |
| 25 | M | M | M | S | S |
| 26 | S | M | M | S | S |
| 27 | M | S | M | S | S |
| 28 | S | S | M | S | S |
| 29 | M | M | S | S | S |
| 30 | S | M | S | S | S |
| 31 | M | S | S | S | S |
| 32 | S | S | S | S | S |

M—MARK
S—SPACE

TAPE

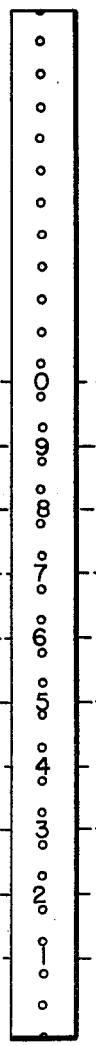

INDICATOR CONTACT POSITIONS

| POSITION NO. | CONTACT NO'S | | | | |
|---|---|---|---|---|---|
| | 1X | 2X | 3X | 4X | 5X |
| 1 | F | F | F | F | B |
| 2 | B | F | F | F | F |
| 3 | F | B | F | F | F |
| 4 | B | B | F | F | F |
| 5 | F | F | B | F | F |
| 6 | B | F | B | F | F |
| 7 | F | B | B | F | F |
| 8 | B | B | B | F | F |
| 9 | F | F | F | B | F |
| 10 | B | F | F | B | F |
| 11 | F | B | F | B | F |
| 12 | B | B | F | B | F |
| 13 | F | F | B | B | F |
| 14 | B | F | B | B | F |
| 15 | F | B | B | B | F |
| 16 | B | B | B | B | F |
| 17 | F | F | F | F | B |
| 18 | B | F | F | F | B |
| 19 | F | B | F | F | B |
| 20 | B | B | F | F | B |
| 21 | F | F | B | F | B |
| 22 | B | F | B | F | B |
| 23 | F | B | B | F | B |
| 24 | B | B | B | F | B |
| 25 | F | F | F | B | B |
| 26 | B | F | F | B | B |
| 27 | F | B | F | B | B |
| 28 | B | B | F | B | B |
| 29 | F | F | B | B | B |
| 30 | B | F | B | B | B |
| 31 | F | B | B | B | B |
| 32 | B | B | B | B | B |

F—FRONT CONTACT
B—BACK CONTACT

FIG. 2.

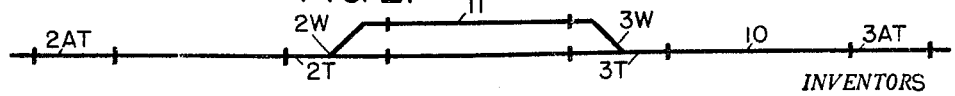

INVENTORS
R. F. ALBRIGHTON
AND W. R. SMITH
BY   *Forest B. Hitchcock*
THEIR ATTORNEY Dec. 8, 1959　　　R. F. ALBRIGHTON ET AL　　　2,916,613
POSTING INDICATOR CONTROL SYSTEM
Filed Sept. 26, 1956　　　　　　　　　　　21 Sheets-Sheet 19
FIG. 6A.
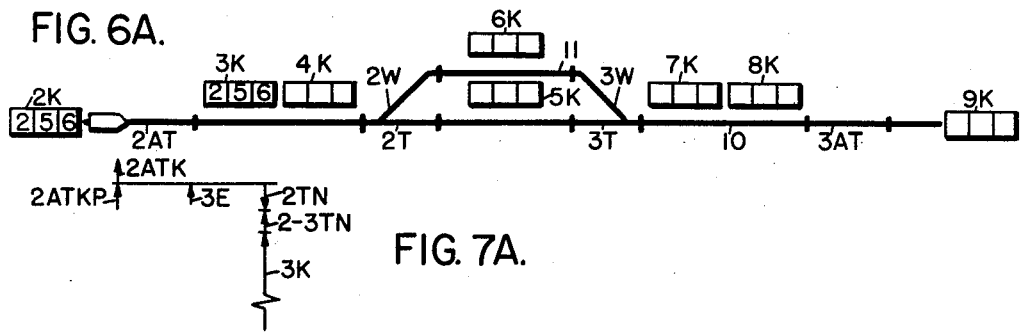
FIG. 7A.
FIG. 6B.
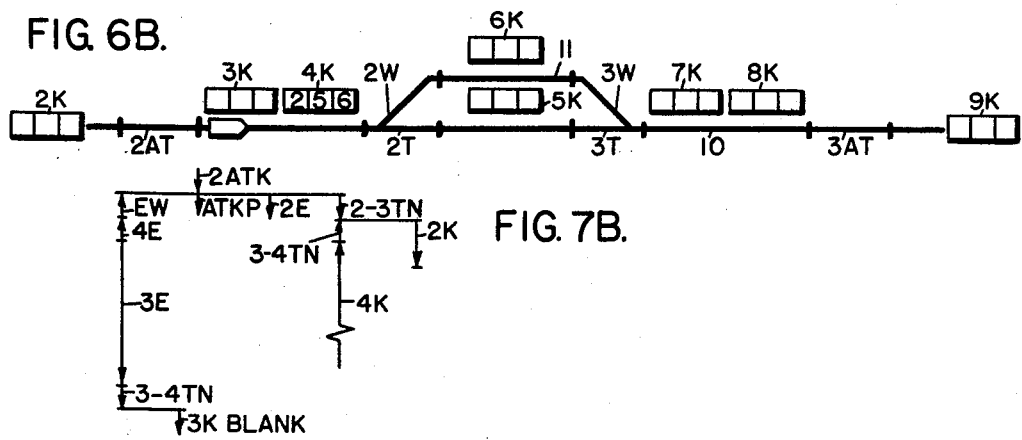
FIG. 7B.
FIG. 6C.
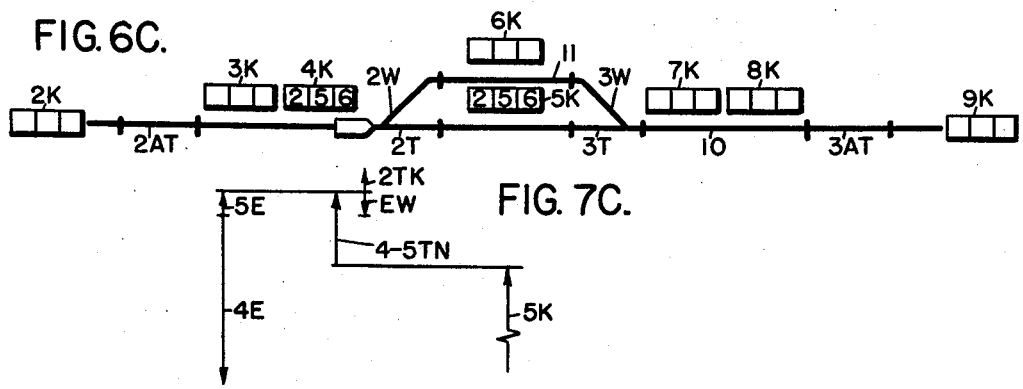
FIG. 7C.
INVENTORS
R. F. ALBRIGHTON
AND W. R. SMITH
BY
THEIR ATTORNEY Dec. 8, 1959  R. F. ALBRIGHTON ET AL  2,916,613
POSTING INDICATOR CONTROL SYSTEM
Filed Sept. 26, 1956  21 Sheets-Sheet 20
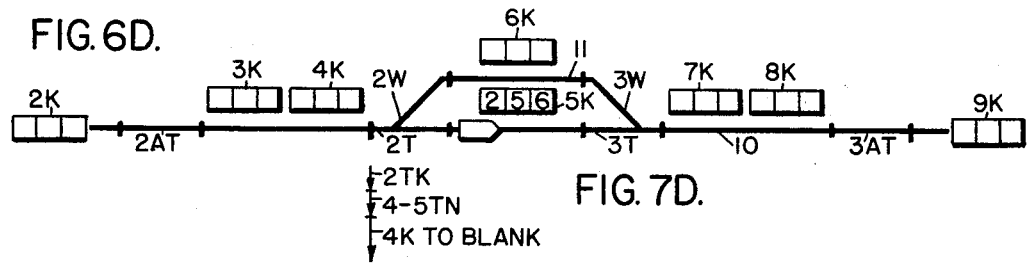
FIG. 6D.
FIG. 7D.
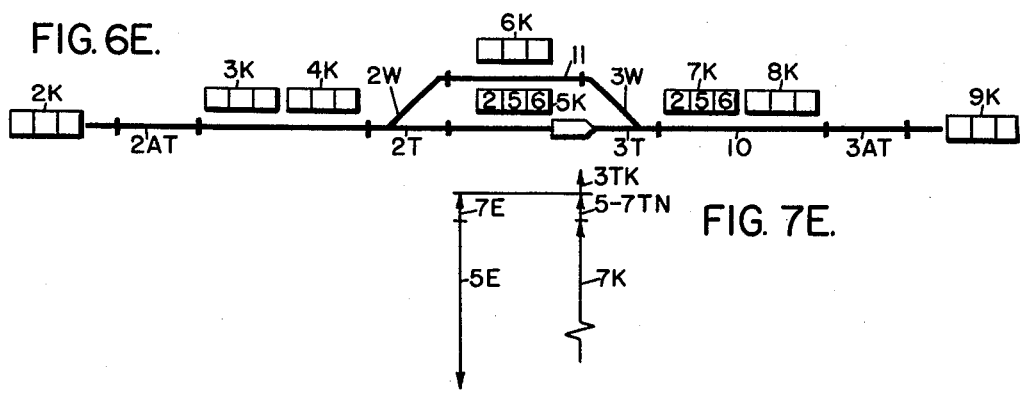
FIG. 6E.
FIG. 7E.
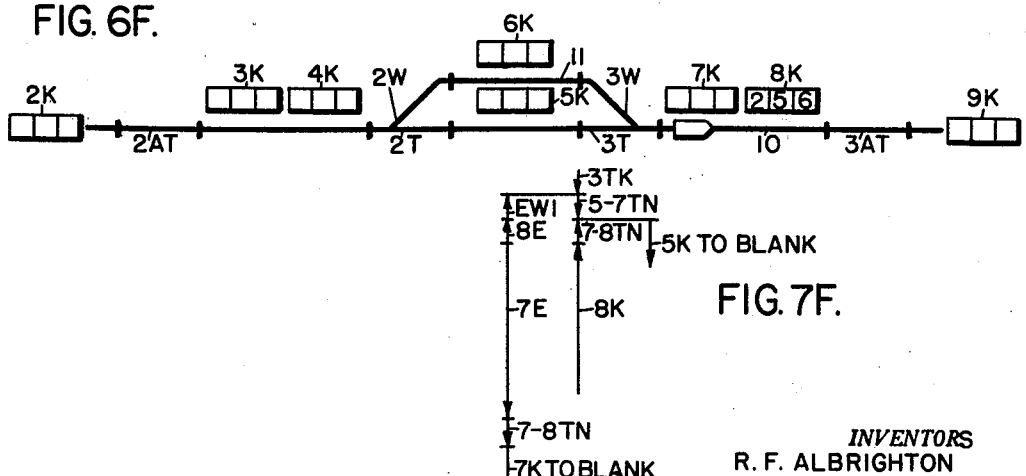
FIG. 6F.
FIG. 7F.
INVENTORS
R. F. ALBRIGHTON
AND W. R. SMITH
BY
*Forest B. Hitchcock*
THEIR ATTORNEY Dec. 8, 1959  R. F. ALBRIGHTON ET AL  2,916,613
POSTING INDICATOR CONTROL SYSTEM
Filed Sept. 26, 1956  21 Sheets-Sheet 21
FIG. 6G.
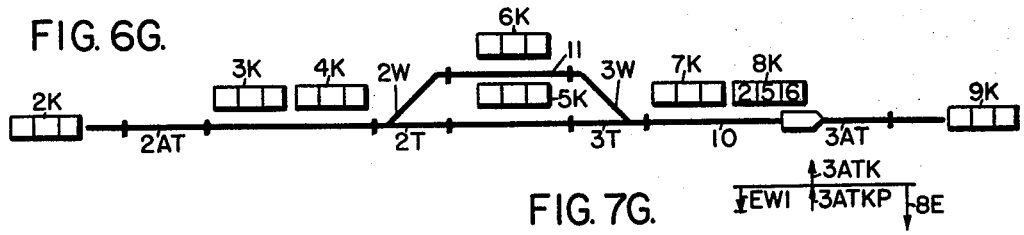
FIG. 7G.
FIG. 6H.
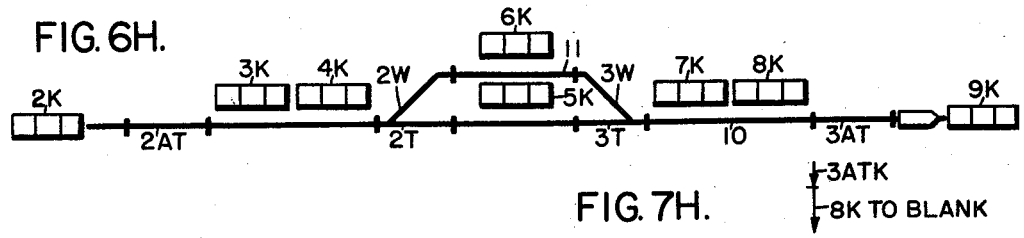
FIG. 7H.
*INVENTORS*
R. F. ALBRIGHTON
BY  AND W. R. SMITH
THEIR ATTORNEY

United States Patent Office 2,916,613
Patented Dec. 8, 1959

2,916,613

POSTING INDICATOR CONTROL SYSTEM

Reginald F. Albrighton and Willis R. Smith, Rochester, N.Y., assignors to General Railway Signal Company, Rochester, N.Y.

Application September 26, 1956, Serial No. 612,245

15 Claims. (Cl. 246—122)

This invention relates to posting indicator control systems, and it more particularly pertains to systems employing posting indicators disposed at different points on a track diagram in connection with railway switch and signal control systems for identifying trains in corresponding sections of trackway.

It has been general practice in switch and signal control systems to identify the positions of the trains in the track layout by the illumination of track occupancy indicator lamps disposed on a track diagram at points comparable to the locations of the track sections from which they are controlled. This, however, gives no indication as to the respective identities of the trains occupying the respective track sections, and the operator of the switch and signal control machine must resort to other information to determine the train identity in order that he may intelligently set up routes for the respective trains.

The present invention provides different banks of power driven posting indicators disposed in various track sections in the track diagram that indicate by distinctive indicia, when positioned, the identity of respective trains occupying the associated track sections. The train identity is set up originally when a train enters the territory illustrated by the track diagram, and the train identity information is transferred from indicator to indicator as the train progresses. This transfer of identity is accomplished automatically in response to the occupancy of the different track sections.

It is contemplated that the number of distinctive identities may be greater than would be practical to provide by a single indicator. Thus, it is provided that several indicators may be used in a bank to set up a single identity, each indicator providing the display of a single digit of a multiple digit identity number.

Although various means may be used for feeding an identity number into the first bank of indicators for a given direction of traffic, one form provided by the present invention is to first designate the identity number manually and set it up in a master indicator bank where the operator of the control machine may visually check that the proper number has been set up. Then the identity number is automatically transferred to the indicator bank at a selected end of the track diagram. The end is selected automatically in accordance with the direction of traffic of the train associated with the identity. This direction of traffic may be defined by odd identity numbers being assigned for trains proceeding in one direction and even identity numbers being assigned for trains proceeding in the opposite direction. In this case, the indicator to receive the identity from the master indicator is selected in accordance with whether the identity number is odd or even.

Rather than leave the indicia for a train identity set up in an indicator bank after transfer of the identity to another indicator bank, the indicators are operated to blank indicating positions after the identity transfer has been completed so that the identity storage is no longer required. Also, where there are digits that are not used in an identity number, the indicators for such digits are operated to blank positions whenever the identity number is set up in these indicators.

An object of the present invention is to provide power driven indicators on a track diagram for train identity display purposes.

Another object of the present invention is to automatically transfer the train identities from posting indicator bank to posting indicator bank as a train progresses.

Another object of the present invention is to automatically blank each indicator bank after transferring out of it.

Another object of the present invention is to operate a posting indicator to blank for each digit in response to designation of a zero for that digit in a multiple digit number, except when a numeral other than a zero has been designated for a preceding digit.

Other objects, purposes and characteristic features of the present invention will be in part obvious from the accompanying drawings and in part pointed out as the description of the invention progresses.

In describing the invention in detail, reference is made to the accompanying drawings in which like reference characters have been used to indicate parts having similar features and functions and in which:

Figs. 1A to 1R (Figs. 1I and 1O are not used) when placed side by side and one above another as indicated in the drawing arrangement of Fig. 5, illustrate one embodiment of the present invention as applied to the control of posting indicator banks on a typical track diagram for train identity purposes;

Fig. 2 is a track diagram of a typical stretch of track for which this embodiment of the present invention is assumed to be provided;

Fig. 3 is a chart indicating codes used and indicator mechanism positions for certain indicia on the tape of an indicator;

Fig. 5 illustrates an arrangement of the different sheets of drawings constituting Fig. 1;

Figure 4:
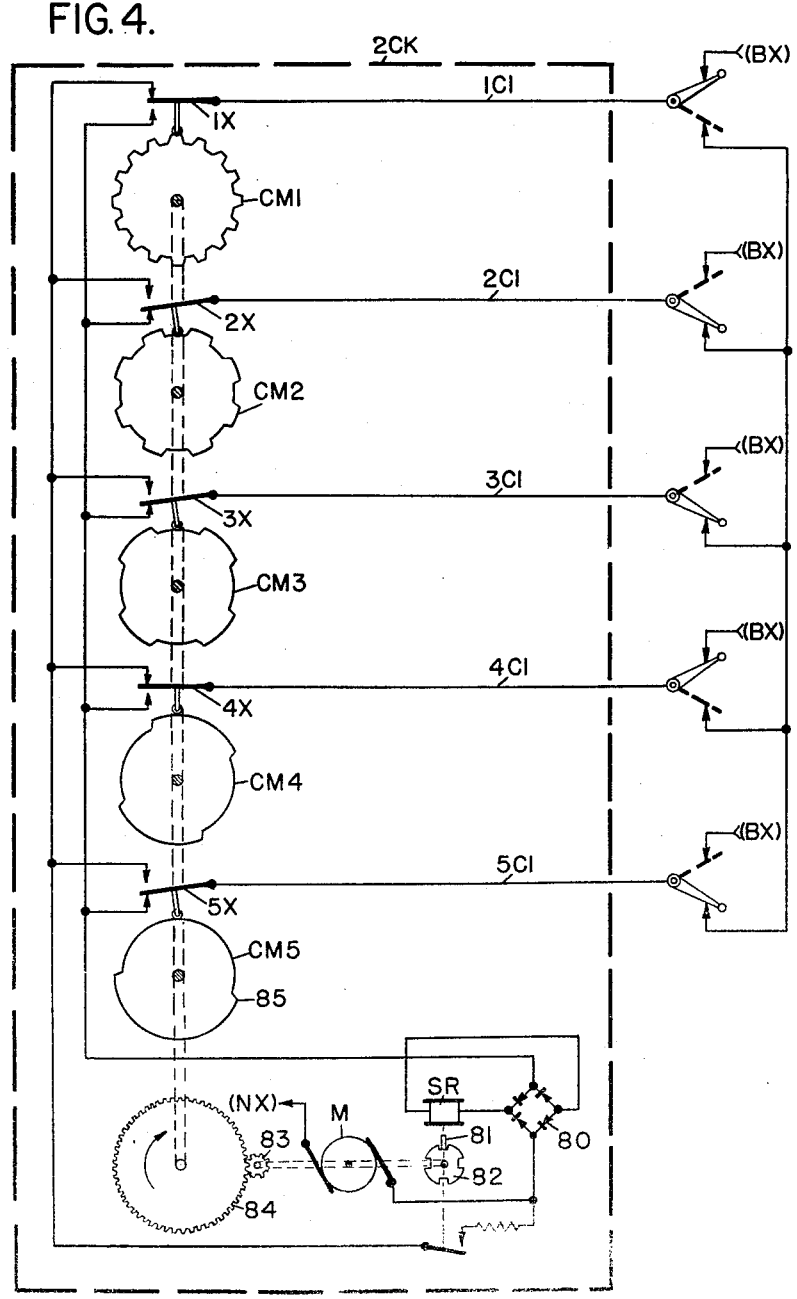
Fig. 4 illustrates schematically a typical circuit and structural organization for the control of an indicator.

Figs. 6A through 6H inclusive illustrate the progress of identity transfer in the various indicator banks in accordance with the passage of an eastbound train; and Figs. 7A through 7H inclusive illustrate respectively the sequence of relay and indicator operations for the respective stages in the progress of an eastbound train as indicated by the different diagrams of Figs. 6A through 6H respectively.

For the purpose of simplifying the illustrations and facilitating the explanation thereof, the various parts and circuits constituting the embodiment of the present invention have been shown diagrammatically and certain conventional illustrations have been employed, the drawings having been made more with the purpose of facilitating the understanding of the principles and mode of operation of the system than with the idea of illustrating the specific construction and arrangement of parts that would be employed in practice. The symbols (+) and (—) are employed to indicate the positive and negative terminals respectively of suitable batteries or other sources of direct current, and the symbols (BX) and (NX) are employed to indicate connections to the respective terminals of a suitable source or sources of alternating current.

In actual practice, the track layouts for which the system would be employed would extend for considerable distance and include several passing sidings. However, to simplify this embodiment of the present invention, the track layout is limited to a stretch of single track 10 (see Fig. 2) having a single passing siding 11 connected thereto by track switches 2W and 3W at the respective ends thereof. It is assumed that the detector track switches 2W and 3W are included in the usual detector track sections 2T and 3T, which sections are provided with track circuits in the usual manner. Approach track sections 2AT and 3AT are provided near the entrance and for eastbound and westbound traffic respectively for the stretch of track illustrated in Fig. 2, and these track sections are also provided with track relays and track circuits in the usual manner.

A diagram is illustrated in Fig. 1B of the track layout as being constructed on a suitable switch and signal control machine control panel, such, for example, as on the panel of the control machine shown in the U.S. patent to J. F. Merkel, Patent No. 2,145,798, issued January 31, 1939.

Several banks of posting indicators K are disposed along the trackway of the diagram as shown in Fig. 1B, each bank K of indicators comprising three indicator units for the display of a three digit number. The indicator banks 2K and 9K are provided for storing the identity of respective eastbound and westbound trains that are about to enter the stretch of track for which the system is provided. Indicator banks 3K, 4K, 5K, 7K, and 8K are disposed in sequence along the trackway corresponding to the main stretch of track 10, and the indicator bank 6K is provided for identity of a train occupying the passing siding. In addition, a master indicator bank MK is provided so that an operator may see directly before him the number he has last designated.

The structure of each of the indicator units in an indicator bank K can be provided in any suitable manner, such, for example, as according to the U.S. patent application of G. E. Marsh, Serial No. 580,123, filed April 23, 1956, or such as is disclosed in the U.S. patent of O. S. Field et al., No. 2,731,632, dated January 17, 1956, or such as the structure indicated in Fig. 4 of the present application. All of the above mentioned indicator structures are of the code controlled type, but it is to be understood that other types of indicators may be used with the system provided according to the present invention.

The posting indicator illustrated in Fig. 4 is illustrative of the general mode of operation of the indicator disclosed in the above mentioned U.S. patent application of G. E. Marsh, Serial No. 580,123, filed April 23, 1956, but structural modifications have been made in this illustration more particularly to facilitate an understanding of the principles of operation. The indicator illustrated in Fig. 4 is provided with an individual driving motor M, and an electric latch relay SR connected in series with the motor through a full wave rectifier 80. The rectifier 80 provided direct current for operation of the latch relay SR but permits the motor M to be operated by alternating current. The relay SR operates a latch 81 out of engagement with a notched disc 82 which is driven by the motor M. The motor M drives a circuit controller which effectively closes different front and back contacts belonging to respective elements of a code in response to which the indicator may be positioned. Thus, the contacts 1X, 2X, 3X, 4X and 5X are respectively associated with code wires 1C1, 2C1, 3C1, 4C1 and 5C1 respectively which are subject to energization respectively in accordance with whether or not a "mark" or a "space" code character is applied to the wire. A mark character is understood as calling for energization of the wire, while a space character is assumed to be no energization of the wire under consideration.

The contacts 1X to 5X inclusive are all operated at different rates by the mechanism of the indicator, and the relative rates of operation of these contacts are schematically illustrated in Fig. 4 by the different surfaces of the cams CM1 to CM5 inclusive. These circuit controller cams are illustrated as being driven by the motor M through reductor gears 83 and 84, it being assumed that the cams CM all make a complete revolution for a single complete revolution of the tape of the indicator (see Fig. 3) which is operable through thirty-two different positions. The cam CM1 operates its contact 1X to close its front contact sixteen times for one revolution of the tape; the cam CM2 operates its contact 2X eight times; the cam CM3 operates its contact 3X four times; the cam CM4 operates its contact 4X twice; and the cam CM5 operates its contacts 5X once. Thus, in one revolution of the tape, the cams CM operate the contacts X to all permutations of these contacts except for the condition where all front contacts are closed, and this position is eliminated by the shortening of the cam CM5 at the point 85 so that one of the positions of the contacts is repeated in the operation of the mechanism for a complete cycle, rather than providing the position of the cams wherein all of the front contacts are closed. Thus, with reference to Fig. 3, positions 1 and 17 are the same. These are both "space" positions on the tape.

With reference to Fig. 1B, a suitable keyboard comprising pushbuttons 0 through 9 is associated with the control panel for the designation of identity numbers for trains entering the controlled territory. It is to be understood that the use of these buttons for setting up the identity numbers is merely by way of illustration, and that various other means may be employed, such as setting up the numbers automatically from a code message which may be received from a remote point. The pushbuttons 0 through 9 inclusive used in this embodiment of the present invention are of the conventional self-restoring type.

A cancel button CB is provided to permit cancellations by an operator under conditions, for example, where the operator has actuated the wrong button in designation of an identity.

Read-in levers RL are provided along the diagram in association with the respective banks of indicators K, except for the indicator banks 2K and 9K at the ends of the track layout, for the purpose of permitting a change to be made in the number displayed by the associated indicator without requiring the change to be progressed successively through the indicator banks from one end of the track diagram. These levers RL are two-position levers having a normal position in which they are normally maintained as is illustrated in Fig. 1B.

With reference to Fig. 1A, the relays Z, R, 1R, A, B and C are provided for sequencing the respective digits when they are designated by actuation of the buttons 0 through 9 for numbers to be set up in the master indicator bank MK. Of these relays, the relays Z, R and 1R are made slow to drop away to permit sufficient time for operation of the indicator units, and the relays A, B and C are used particularly for channeling the code into the proper master indicators MAK, MBK and MCK for the respective digits of the identity number.

A bank of relays CR and a relay BL are provided for setting up a code for operation of the indicators of the indicator bank MK in accordance with the buttons that have been actuated for designation of the train identity codes.

A description selecting relay 0E (see Fig. 1D) is provided for selecting the indicator bank 2K or 9K as being the bank to receive an identity number from the master indicator MK. Description storage relays E and W and EW are provided in association with various indicators for the purpose of facilitating the transfer from indicator to indicator as a train progresses. These relays are made slow to drop away to cover the operating time of the indicators K with which they are associated. Transfer relays TN are also provided for the purpose of transferring, or reading-out in the progress of the train identity storage from indicator bank to indicator bank as a train progresses.

With reference to Fig. 1B, relays R and 1R1 are provided for permitting reading-in to any one of the indicators along the trackway when it is desired to change a train identity associated with such indicator.

Having thus described in general the apparatus provided in one embodiment of the present invention, more detailed consideration will be given upon consideration of various typical operating conditions of the system.

*Operation*

In considering the mode of operation of the system, the mode of operation will first be considered for setting up a three digit number in the master indicator bank MK (see Fig. 1B). To illustrate the setting up of a specific identity number, it will be assumed that the operator designates No. 256 as the identity number of an eastbound train that is about to enter the controlled territory.

To set up this number, the operator first actuates the button 2, and the closure of contact 86 of this button applies energy to the code wire 3C which in turn energizes the lower winding of the code relay 3CR. This relay when picked up is maintained energized through its stick contact 87 by energy applied through either back contact 88 of relay Z or front contact 89 of relay R. Back contact 88 of relay Z is the contact that is closed initially and that is effective immediately upon the picking up of relay 3CR.

The picking up of relay 3CR causes the picking up of relay R by the energization of a circuit extending from (+), including front contact 90 of relay 3CR, back contact 91 of relay Z, back contact 92 of relay 1R, and winding of relay R, to (−). It will be noted that the relay R can be energized similarly through any one of the front contacts 93, 94, 95 or 96 of relays 2CR, 4CR, 5CR and BL respectively in accordance with the particular code that is set up. Relay R when picked up causes the picking up of relay Z by the closure of its front contact 97.

Relay A is now picked up to feed the code that has been set up by the actuation of the button 2 into the master indicator MAK (see Fig. 1D) to register the first digit of the identity code. The circuit by which the relay A is energized at this time extends from (+), including front contact 98 of relay Z (see Fig. 1A), back contacts 99 and 100 of relays B and C respectively, lower winding of relay A and contact 101 of cancel button CB. Relay A when picked up is maintained energized by a stick circuit provided for its upper winding through front contact 102 of relay Z and front contact 103 of relay A. The picking up of relay A initiates the operation of the master indicator MAK, and relays R and Z are dropped away successively, maintaining energy on the indicator MAK for sufficient time prior to their being dropped away to complete the operation of the indicator MAK. This timing is provided by the relays R and Z being made slow to drop away. Relay R is deenergized upon the picking up of relay Z by the opening of back contact 91, and the relay Z is deenergized upon the dropping away of relay R by the opening of front contact 97 of relay R. The times involved in the slow drop-away of relays R and Z are relatively long, and thus the operator of the control machine will have restored the button 2 that he has actuated prior to the dropping away of either of these relays. Relay A is not dropped away by the opening of its stick circuit at front contact 102 of relay Z, but is maintained energized through back contact 104 of relay C until relay C is picked up for registration of the last digit of the code in the master indicator. The stick bus for the relays CR is opened at front contact 89 of relay R, so these relays that have been picked up in accordance with the numeral that has been designated are dropped away. The illumination of the indicator lamp OPE advises the operator when a master indicator is being operated so that he will wait until the lamp is extinguished before operating another push button. Lamp OPE is energized through front contact 209 of relay Z.

In the operation of the indicator, it is operated from its previously set position, and the manner in which the motor circuit is made up through different circuits dependent upon the prior setting. If it is assumed, however, that the last setting has been in accordance with a space being applied as the third element of the code rather than a mark, the application of a mark in accordance with the button 2 having been actuated closes an operating circuit for the motor M of the indicator MAK upon the picking up of relay A to energize the motor M with alternating current. This circuit extends from (BX), including back contact 105 of relay C (see Fig. 1C), back contact 106 of relay B, front contact 107 of relay Z, front contact 108 of relay 3CR, back contact 109 of relay B, back contact 110 of relay C, front contact 111 of relay A, wire 112, back contact 113 of indicator MAK, rectifier 114, motor M of indicator MAK, wire 115, back contact 116 of relay 9TN, and back contact 117 of relay 2TN, to (NX). The operation of the indicator MAK is thus initiated, and it will continue to drive until its contacts are positioned in correspondence with the code space-space-mark-space-space. When this code is satisfied, the indicator MAK will have its circuit opened by the opening of back contact 113 because a mark has been applied to the code wire 112 with which this contact is associated. All of the other contacts of the indicator MAK will be closed in their back positions in correspondence with space code characters being applied for the corresponding control wires. The latch winding SR of the indicator MAK is maintained energized by direct current from the rectifier 114 and in series with the motor M during the operation of the indicator until the motor circuit is opened just prior to the indicator positions being satisfied, and the shifting of contact 113 from its back to its front position provides energy through the front contact 118 of the latch SR and the resistor 119 to provide for operation of the motor M of indicator MAK at reduced voltage until the latch of the indicator drops into a cooperating slot to lock the indicator in its position wherein the indicator tape displays the character "2" as is diagrammatically illustrated in Fig. 3 wherein the character "2" appears on the indicator tape for code No. 28, which is the code that has been considered as having been designated for the operation of the indicator MAK.

After the relay Z has had time to become dropped away, the opening of its front contact 107 disconnects the motor circuit which has been closed for the motor M of the indicator MAK. The dropping away of relay Z causes the picking up of the relay B to condition the system for the actuation of the indicator MBK in response to the next actuation of a push button for designation of the second digit of the number. Relay B is picked up at this time by the energization of a circuit extending from (+), including back contact 98 of relay Z, front contact 120 of relay A, lower winding of relay B, and contact 101 of cancel button CB, to (−). Upon the picking up of this relay, a stick circuit is established through its upper winding to maintain this relay energized. The upper winding of relay B is fed through the stick contact 121 by front contact 122 of relay A connected in multiple with back contact 102 of relay Z.

Inasmuch as the number being set up is number 256, the operator can now actuate push button 5 (see Fig. 1B), and in accordance with the actuation of this button, the indicator MBK is operated to display the number 5.

With reference to Fig. 1B, the actuation of the push button 5 applies energy to control wire 2C through contact 123 and to wire 4C through contact 124, corresponding with marks being called for in code No. 22 in the code table of Fig. 3 for the second and fourth digits of the code. This causes the simultaneous energization of the relays 2CR and 4CR, the relays 2CR and 4CR being energized by circuits comparable to circuits that have been described for the operation of relay 2CR. Relay R is picked up in response to the picking up of relay CR by the energization of a circuit that has been described, and the closure of its front contact 97 provides for the picking up of relay Z.

Relay Z in picking up causes the picking up of relay C by the energization of a circuit extending from (+), including front contact 98 of relay Z, front contact 125 of relay A, front contact 126 of relay B, lower winding of relay C, and contact 101 of cancel button CB, to (—). A stick circuit is established for relay C upon the picking up of this relay through front contact 127 of relay B, front contact 128 of relay C and the upper winding of relay C. There is also an auxiliary stick circuit which is closed at a later time for maintaining relay C energized through back contact 103 of relay A and front contact 102 of relay Z.

Operation of the indicator MBK (see Fig. 1D) is initiated upon the picking up of relay Z, and if it is assumed that the contacts of the indicator MBK that are associated with the code digit numbers 2 and 4 are initially in their dropped away positions, a motor operating circuit is closed extending from (BX), including front contact 129 of relay A (see Fig. 1C), front contact 106 of relay B, front contact 107 of relay Z, front contact 130 of relay 2CR, front contact 131 of relay B, wire 132, back contact 133 of indicator MBK, rectifier 134, motor M of indicator MBK, wire 115, back contact 116 of relay 9TN, and back contact 117 of relay 2TN, to (NX). The motor M of indicator MBK is also energized by a circuit extending from (BX), including front contact 129 of relay A (see Fig. 1C), front contact 106 of relay B, front contact 107 of relay Z, front contact 135 of relay 4CR, front contact 136 of relay B, wire 137, back contact 138 of indicator MBK, rectifier 134, motor M of indicator MBK, wire 115, back contact 116 of relay 9TN and back contact 117 of relay 2TN, to (NX). The motor M of indicator MBK will continue to drive until the contacts 133 and 138 in the above circuit are opened and until conditions are met wherein the other contacts of the indicator MBK are all operated to their back contact positions. This according to the code table of Fig. 3 is the condition that is found only when the tape is driven to the point of displaying the numeral 5 as is indicated in Fig. 3 for the particular code No. 22 that has been set up.

Relay R has been energized by the picking up of relay Z upon the opening of back contact 91, and after this relay is dropped away, stick energy is removed from the relays CR so that they become dropped away. The dropping away of relay R removes energy from relay Z by the opening of front contact 97, and relay Z then becomes dropped away.

The dropping away of relay Z causes the dropping away of relay A. Relay A is dropped away because the stick circuit by which it has been maintained energized is opened at front contact 102 of relay Z, its other source of stick energy through back contact 104 being open because of relay C being in its picked up condition at this time.

The system is now in condition for the actuation of a push button for designation of the last digit of a number, and if the number is assumed to be No. 256, it will be assumed that an operator actuates the push button 6 for designation of the last digit of this number. The actuation of push button 6 applies energy through contact 139 to code wire 3C, and also applies energy through contact 140 to code wire 4C. In accordance with the energization of these code buses, the corresponding relays 3CR and 4CR become picked up by the energization of circuits that have been heretofore considered, and these relays are maintained energized until there has been sufficient time for operation of the indicator MCK in correspondence with the code that has been set up.

In accordance with the picking up of relays 3CR and 4CR, relays R and Z are energized by circuits that have been heretofore considered, and the picking up of relay Z causes the dropping away of relay B by the opening of the stick circuit for relay B at back contact 102. Stick energy through front contact 122 of relay A has already been removed by the dropping away of relay A. Thus relay B becomes dropped away at this time, and the dropping away of this relay conditions circuits for the control of the indicator MCK and disconnects the code wire connections to the indicator MBK. Relay 1R becomes picked up subsequent to the dropping away of relay B by the energization of a circuit extending from (+), including front contact 88 of relay Z, back contact 141 of relay B, front contact 142 of relay C, and winding of relay 1R, to (—).

If it is assumed that the contacts 143 and 144 which are associated with the code wires to which marks are applied for actuation of the indicator MCK (see Fig. 1D) to a position for displaying a 6 on the indicator tape, motor circuits are closed directly through these contacts for driving the indicator MCK, and the indicator MCK is maintained in operation until the code is satisfied wherein the contacts 143 and 144 are actuated to their front positions, and all of the other contacts are actuated to their back positions as called for in the chart of indicator contact positions of Fig. 3 for position No. 20 of the indicator, corresponding to code No. 20 of the code table. The circuit by which energy is applied to the motor of indicator MCK in accordance with a mark being designated for the third digit of the code extends from (BX), through back contact 129 of relay A (see Fig. 1C), front contact 105 of relay C, back contact 106 of relay B, front contact 107 of relay Z, front contact 108 of relay 3CR, back contact 109 of relay B, front contact 110 of relay C, wire 145, back contact 143 of indicator MCK, rectifier 146, motor M of indicator MCK, wire 115, back contact 116 of relay 9TN, and back contact 117 of relay 2TN, to (NX). Another source of energy for the motor M of indicator MCK is provided by a circuit extending from (BX), including back contact 129 of relay A (see Fig. 1C), front contact 105 of relay C, back contact 106 of relay B, front contact 107 of relay Z, front contact 135 of relay 4CR, back contact 136 of relay B, front contact 147 of relay C, wire 148, back contact 144 of indicator MCK, rectifier 146, motor M of indicator MCK, wire 115, back contact 116 of relay 9TN, and back contact 117 of relay 2TN, to (NX).

After the indicator MCK has had sufficient time to complete its operation, relay R (see Fig. 1A) becomes dropped away, and the dropping away of this relay causes the dropping away of relay Z by the opening of front contact 97. Although the dropping away of relay Z removes energy from relay 1R, this relay is made slow to drop away to provide time for the actuation of relays required for the transfer of the train identity that has been set up into one of the indicator banks on the track diagram. Relay C has been maintained energized by a stick circuit extending from (+), including front contact 102 of relay Z, back contact 103 of relay A, front contact 128 of relay C, upper winding of relay C, and contact 101 of cancel button CB, to (—), but this circuit is opened by the dropping away of relay Z, and therefore the relay C becomes dropped away.

Blanking

In setting up a single or two digit number in the master indicator bank MK, it is provided that the indicators that are not used for the preceding digits of the number are operated to respective blank indicating positions. This mode of operation is accomplished without a special blanking key, but is done in response to the actuation of the 0 push button. In other words, the 0 push button has two functions, one being to actually cause a zero to be set up in the indicator, and the other to operate the indicator to blank, provided that there is no preceding digit having a numeral in the identity number that is being set up.

To consider the mode of operation in setting up a typical number where blanking is effective, it will be assumed that the operator actuates the push button to set up the identity number 20. Inasmuch as there is no first digit in this number, the operator actuates the 0 push button initially, and the actuation of this button applies energy through contacts 149 and 150 to the code wires 3C and 5C respectively. Thus, relay 3CR is picked up, and the relay 5CR is picked up by the energization of circuits similar to circuits that have been described. The relays R, Z and A are picked up successively by a mode of operation which has been described, and upon the picking up of relay A, a circuit is closed to energize the blanking relay BL extending from (+), including back contact 151 of relay C, back contact 152 of relay B, front contact 153 of relay A, front contact 154 of relay 5CR, front contact 155 of relay 3CR, winding of relay BL and contact 101 of the cancel button CB. This relay when picked up is maintained energized by a stick circuit extending from (+), including back contact 151 of relay C, front contact 156 of relay BL, and contact 101 of cancel button CB, to (—). Another stick circuit is established for the relay BL extending from (+), including front contact 157 of relay BL, front contact 154 of relay 5CR, front contact 155 of relay 3CR, winding of relay BL, and contact 101 of cancel button CB, to (—). If upon considering these stick circuits for relay BL, it will be noted that this relay is maintained energized until the picking up of relay C and this occurs at the time when energy is applied to the indicator MBK for the second digit of the number. If this second digit has also been designated by the actuation of the 0 push button, the last described stick circuit is maintained closed, and the blanking relay BL is maintained picked up during the setting of the indicator MBK. If, however, there is a different code set up in response to the actuation of one of the push buttons for a numeral other than zero as a second digit, one or the other of the front contacts 154 or 155 will be opened and thus the blanking relay BL will become dropped away to permit the indicator MBK to be operated in accordance with the numeral that has been designated rather than being operated to a blank indicating position.

When relay Z becomes picked up to close its front contact 107 in response to the above described designation for the first digit of a number, with the blanking relay BL in its picked up position, energy is applied to the indicator MAK to drive this indicator to a blank indicating position. More specifically, if it is assumed that the back contact 158 of indicator MAK is closed, the picking up of relay Z applies energy to the motor M of indicator MAK through a circuit extending from (BX), including back contact 105 of relay C, back contact 106 of relay B, front contact 107 of relay Z, front contact 159 of relay BL, back contact 160 of relay B, back contact 161 of relay C, front contact 162 of relay A, wire 163, back contact 158 of indicator MAK, rectifier 114, motor M, indicator MAK, wire 115, back contact 116 of relay 9TN and back contact 117 of relay 2TN, to (NX).

The application of energy under the above described conditions is comparable to calling for a mark as a first digit according to the code table of Fig. 3, and in accordance with this code table, it will be noted that whenever a mark is called for as the first digit, irrespective of the code elements for the subsequent digits, the indicator is always operated to a blank position on the tape. Thus, the blank position to which the indicator MAK is operated under the above described conditions will be the position between the indicia 0 and 9 on the tape, or between 9 and 8, or between any other numerals on the tape, or in the blank section of the tape that is not used above the zero. This is true because it will be noted that in order for the tape to stop on a zero or a numeral, the first digit of the code must be a space rather than a mark.

Inasmuch as mark code elements for the first digit of the code are used for blanking, and according to the code table and the corresponding structure of the indicator, the codes in sequence alternate as to mark and space characters for the first digit and therefore numeral and blanking positions alternate on the indicator tape. If the last operation is for the indication of a numeral, and a blank is subsequently designated by the application of a mark, the indicator is actuated just to its next position which will be the next position between numerals because of the fact that only the first element of the code need be satisfied, and this element is satisfied by only a single step in the operation of the indicator MAK.

With reference to Fig. 4, the diagrammatic illustration of this figure shows an indicator as standing on a blank position which corresponds to code No. 23. This can very well be the position to which the indicator MAK may be operated by the energization of the above described circuit, the cam CM1 and the contact 1X being associated with the first digit of the code, and the contact 1X corresponding in its mode of operation to the contact 158 referred to in Fig. 1D in the indicator MAK.

To consider further the setting up of the above mentioned No. 20 as an identity number, the actuation of the button 2 for designation of the second digit of the number causes the picking up of relay 3CR in accordance with the closure of contact 86 of the push button 2. Inasmuch as the relay 5CR is not picked up, front contact 154 is opened in one of the stick circuits for relay BL, and the relay BL becomes dropped away upon the picking up of relay C when operation of the indicator MBK is initiated. Thus, the indicator MBK is driven to its position to indicate the numeral 2, and because of the relay C having been picked up to open back contact 151 in the circuit for the blanking relay BL, the blanking relay BL cannot be picked up again during the setting up of the identity number under consideration.

Therefore, upon actuation of the 0 push button for designation of 0 as the last digit of the identity number 20, the blanking relay BL remains in its dropped away position, and the relays 3CR and 5CR are picked up in accordance with the code corresponding to the zero that has been designated. This is code No. 12 according to the code table of Fig. 3, and the indicator MCK for the third digit of the identity number is operated to a position to display 0 on the tape by the general mode of operation that has been heretofore described for the operation of this indicator for the third digit of the identity number.

Another type of blanking after transfer of an identity out of an indicator will be hereinafter considered.

*Transfer*

After the master indicator bank has been conditioned to indicate a three digit number, the system is now in condition for transfer of the number to the indicator bank 2K, or the indicator bank 9K, dependent upon whether the identity is for an eastbound or a westbound train. This identity sorting as to eastbound or westbound direction is provided by the manner in which the identity numbers are assigned so that only even numbers are used for eastbound trains and only odd numbers are used for westbound trains. Thus, if it is an even number that is set up in the master indicator, it is predetermined that transfer will be made into the indicator bank 2K, and if the identity number set up in the master indicator is odd, it is predetermined that the transfer will be made to the indicator bank 9K at the right-hand end of the track diagram. Thus, relay 0E (see Fig. 1D) selectively determines which indicator bank is to receive the identity in accordance with whether or not this relay 0E is picked up. This relay is picked up if the identity number is odd in accordance with a mark being applied as the second digit of the code according to the code table of Fig. 3 for the indicator corresponding to the third digit of the number. In other words, if the relay 2CR is picked up for operation of the master indicator MCK for the last digit, it is determined that the relay 0E will be picked up in accordance with the number being odd, and the picking up of this relay is effective to cause transfer into the indicator bank 9K. The circuit for relay 0E becomes closed only after the relay 1R has been picked up as has been described after designation of the last digit of the number to be set up in the master indicator bank. The circuit by which relay 0E is picked up, provided that the number designated is odd, extends from (+), including front contact 163 of relay 1R (see Fig. 1C), front contact 164 of relay 2CR, wire 165 and winding of relay 0E, to (—).

After the relay Z (see Fig. 1A) has had time to become dropped away, the relay 2TN or the relay 9TN is picked up in accordance with the condition of the relay 0E, but first a relay 2E (see Fig. 1J) or a relay 9W (see Fig. 1M) must be picked up. If it is assumed that the number is even, the relay 2E is picked up by the energization of a circuit extending from (+), including back contact 166 of relay 1R1, back contact 167 of relay 0E, back contact 168 of track indication relay 2ATK, wire 169, back contact 170 of relay Z, front contact 171 of relay 1R, and winding of relay 2E, to (—). This relay when picked up is maintained energized through its stick contact 172 by energy fed through back contacts 173 and 174 of relays 2ATKP and 3E, respectively, and through front contact 175 of relay 2ATK. Had the number designated been an odd number so that the relay 0E would have been picked up, the relay 9W would have been picked up by the energization of a similar circuit except that it would have been energized through front contact 176 of relay 0E rather than through a back contact as has been described for the energization of relay 2E.

Having thus conditioned a directional relay 2E or 9W in accordance with whether the number is odd or even, the transfer relay 2TN or 9TN (dependent upon whether the number is even or odd) becomes picked up. If the number is even, the transfer relay 2TN (see Fig. 1E) becomes picked up by the energization of a circuit extending from (+), including front contact 177 of relay 1R, back contact 178 of relay Z, wire 179, back contact 180 of relay 0E, back contact 181 of relay 2ATK, wire 182, and winding of relay 2TN, to (—). In case the identity number is odd rather than even, the relay 9TN (see Fig. 1H) is picked up rather than the relay 2TN by the energization of a similar circuit except that selection is made through front contact 180 of relay 0E.

With the transfer relay 2TN, for example, picked up, the system is conditioned for transfer of the indication from each of the indicators MAK, MBK and MCK of the master indicator to corresponding indicators of the indicator bank 2K. For purposes of simplicity, however, rather than show the transfer circuits for the three indicators of the indicator bank 2K, only the transfer circuits have been shown for the indicator involved in setting up the last digit of the identity number, but it is to be understood that a similar means of transfer is provided for the indicators that are associated with setting up the other two digits of the identity number. More specifically, with reference to Fig. 1D, the indicator for the bank MAK that is associated with the first digit of the identity number is controlled through back contacts 182a, 183, 184, 185 and 186 of relay 1R1. Similarly, the indicator MBK belonging to the second digit of the identity number is operated through back contacts 187, 188, 189, 190 and 191 of relay 1R1.

In reading out of an indicator, energy is applied to the bus connecting the front contacts of that indicator, and thus these contacts serve in a similar capacity to the front contacts of the relay CR in reading a code into the indicator to which the identity is to be transferred. Thus, if the master indicator MCK for the third digit of the identity number is operated to No. 6 position, as has been heretofore described, the contact positions assume position No. 20 according to the indicator contact position table of Fig. 3 and in this position front contacts 143 and 144 are closed, and the other contacts of the indicator MCK are closed as back contacts.

A motor circuit is therefore established for the indicator 2CK (see Fig. 1E) extending from (BX), including back contact 192 of relay 1R1 (see Fig. 1D), wire 193, front contact 194 of relay 1R, back contact 195 of relay Z, wire 196, back contact 197 of relay 0E, wire 198, front contact 199 of relay 2E, front contact 200 of relay 2TN, wire 201, back contact 515 of relay 1R1, front contact 143 of the master indicator MCK, back contact 202 of relay 1R1, wire 203, front contact 204 of relay 2TN, back contact 205 of indicator 2CK, rectifier 206, motor M of indicator 2CK, wire 207, front contact 208 of relay 2E, and front contact 209 of relay 2TN, to (NX). A similar operating circuit is provided through front contact 144 of the master indicator MCK so that energy is maintained on the indicator 2CK until it is actuated to correspondence with the indicator MCK so that its contacts are positioned to correspond with the contacts of the indicator MCK wherein front contacts 143 and 144 and all remaining back contacts are closed.

Read-out energy is maintained on the master indicator MCK through the circuits that have been heretofore considered for sufficient time to permit completion of operation of the indicator 2CK as is timed by the drop away time of the relay 1R which is made slow enough in dropping away to insure time of operation for the indicator 2CK.

*Passage of a train*

Upon entrance of a train into the approach track section 2AT at the entrance to the track layout (see Fig. 2), the track relay (not shown) belonging to this track circuit is dropped away, and an indication of occupancy of this track section is transmitted via a suitable code communication system (not shown) to the control office. The reception of this indication causes the picking up of the magnetic stick relay 2ATK (see Fig. 1F), which when picked up is maintained in its picked up position until the reception of an indication from the field that the track section is again unoccupied. The picking up of relay 2ATK causes the picking up of its repeater relay 2ATKP (see Fig. 1J) by the energization of an obvious circuit closed at front contact 210 of relay 2ATK.

The picking up of the approach indication relay 2ATK causes the energization of relay 3E (see Fig. 1K). The circuit by which relay 3E is picked up extends from (+), including front contact 211 of relay 2E (see Fig. 1J), wire 212, front contact 213 of relay 2ATK, back contact 214 of relay EW, wire 215, back contact 216 of relay 3W, wire 217, and upper winding of relay 3E, to (—). This relay when picked up is maintained energized by a stick circuit including back contacts 218 and 219 of relays 4E and EW connected in multiple, front contact 220 of relay 3E, wire 215, back contact 216 of relay 3W, wire 217, and upper winding of relay 3E.

The picking up of the occupancy indication relay 2ATK is also effective to cause the dropping away of the transfer relay 2TN (see Fig. 1E) by the opening of its circuit at back contact 181. This relay when dropped away closes a circuit to cause the picking up of the relay 2–3TN to permit the identity number stored in the indicator 2CK to be transferred to the indicator 3CK. The circuit by which relay 2–3TN is energized extends from (+), including back contact 221 of relay 3–4TN (see Fig. 1F), front contact 222 of relay 2ATK, wire 223, winding of relay 2–3TN, front contact 224 of relay 2E, and back contact 225 of relay 2TN, to (—).

Upon the picking up of relay 2–3TN, the indicator 3CK is operated in accordance with the identity number that is set up in the relay 2CR. If it is assumed that this is No. 6, corresponding to the last digit of the No. 256 that has been heretofore considered, read-out energy is applied through front contacts 205 and 226 of indicator 2CK in accordance with the code No. 20 of the code table of Fig. 3 being required to operate the tape of the posting indicator to a No. 6 indicating position. If it is assumed that back contacts are closed in the indicator 3CK corresponding to the contacts 205 and 226 of indicator 2CK, motor driving circuits can be traced for the indicator 3CK. One circuit extends from (BX), including front contact 227 of relay 2–3TN, front contact 228 of relay 2E, front contact 205 of indicator 2CK, front contact 229 of transfer relay 2–3TN, back contact 229a of indicator 3CK, rectifier 230, latch winding 231, motor M of indicator 3CK, wire 232, front contact 233 of relay 2–3TN, and front contact 234 of relay 2E, to (NX). It will be noted that although the motor energy for driving the indicator 3CK flows through the control circuits of the indicator 2CK, the indicator 2CK cannot be driven because the motor circuit is open at front contact 209 of relay 2TN. A similar circuit for driving the indicator 3CK is closed through the front contact 226 of the indicator 2CK, front contact 235 of relay 2–3TN and back contact 236 of the indicator 3CK so that the indicator 3CK is driven until its contacts are positioned in correspondence with the contacts of the indicator 2CK and thus is positioned to display the No. 6 corresponding to the identity number that is assumed to have been set up in the indicator 2CK.

After passage of an eastbound train out of the approach track section 2AT, the relay 2ATK becomes dropped away, and its repeater relay 2ATKP subsequently becomes dropped away. The dropping away of relay 2ATK causes the dropping away of relay 2E by the opening of its circuit at front contact 175, the back contact 174 of relays 3E being opened at this time. The transfer relay 2–3TN also becomes dropped away at this time because of the opening of its circuit at front contact 222 of relay 2ATK (see Fig. 1F). The dropping away of the occupancy indicator relay 2ATK also causes the picking up of the relay EW (see Fig. 1P). The circuit by which relay EW is picked up extends from (+), including back contact 237 of relay 2ATK, front contact 238 of relay 3E, back contact 239 of relay 4E, back contact 240 of the track indication relay 2TK that is associated with the left hand end of the passing siding, and winding of relay EW, to (—). This relay when picked up is maintained energized by a stick circuit extending from (+), including back contact 237 of relay 2ATK, front contact 241 of relay EW, back contact 240 of relay 2TK, and winding of relay EW, to (—).

Relay EW when picked up causes the picking up of relay 4E (see Fig. 1K) by the energization of a circuit extending from (+), including back contact 242 of relay 3W (see Fig. 1J), wire 243, back contact 244 of relay 2ATK, front contact 245 of relay 3E, front contact 246 of relay EW, back contact 247 of relay 4W, and winding of relay 4E, to (—). This relay when picked up is maintained energized by a stick circuit extending from (+), including back contact 248 of relay 5E, wire 249, front contact 250 of relay 2NK, front contact 251 of relay 4E, back contact 247 of relay 4W, and winding of relay 4E, to (—). Relay 4E when picked up causes the dropping away of relay 3E by the opening of its circuit at back contact 218, back contact 219 of relay EW being open at this time. Relay 3E is made slow to drop away, however, so that time will be provided for completion of the operation of the indicator 4K before the front contacts of relay 3E are opened.

Immediately upon the dropping away of relay 2–3TN as has been described in response to the approach track section 2AT having become unoccupied, the transfer relay 3–4TN is picked up to transfer the train identity to the indicator 4CK. The circuit by which relay 3–4TN (see Fig. 1F) is picked up extends from (+), including back contact 252 of relay 4–5TN, front contact 253 of relay EW, winding of relay 3–4TN, front contact 518 of relay 3E, wire 254, and back contact 255 of relay 2–3TN, to (—). If it is assumed that the identity number to be transferred is No. 6 and that the front contact 229a of the indicator 3CK is closed and the back contact 256 of the indicator 4CK is closed, the motor of the indicator 4CK becomes energized by a read-out circuit extending from (BX), including back contact 257 of relay 4W, front contact 258 of relay 3–4TN, front contact 259 of relay 3E, wire 260, front contact 220a of indicator 3CK, wire 261, front contact 262 of relay 3–4TN, back contact 256 of indicator 4CK, rectifier 263, latch winding 264, motor M of indicator 4CK, wire 265, back contact 266 of relay 4W, front contact 267 of relay 3–4TN and front contact 268 of relay 3E, to (—).

The dropping away of relay 2E upon the approach track section 2AT having become unoccupied causes the blanking of the indicator 2K which is associated with the entrance end of the track diagram. This blanking is provided by application of energy to a contact of the indicator 2CK corresponding to the contact 1X of Fig. 4 which is effective to drive the indicator to the next blank position on the tape, which according to the tables of Fig. 3 requires only a single step of operation of the indicator. Thus, energy is applied for blanking to drive the indicator 2CK through a circuit extending from (BX), including back contact 269 of relay 2TN (see Fig 1J), back contact 270 of relay 2E, back contact 271 of relay 1R, back contact 272 of relay 2–3TN, wire 273, back contact 274 of indicator 2CK, rectifier 206, latch winding 275, motor M of indicator 2CK, wire 207, back contact 208 of relay 2E, and back contact 276 of relay 2–3TN, to (NX). Upon advancing the tape of the indicator 2CK just one position, the back contact 274 is opened and thus the indicator 2CK becomes stopped on a blank position of the tape.

With reference to Fig. 6C, the entrance of an eastbound train into the detector track section 2T causes transfer of the identity number from the indicator bank 4K to the indicator bank 5K.

To consider the sequence of relay operations to accomplish the above described transfer, the track indication relay 2TK is first picked up by the communication of an indication of track occupancy from the field, and the picking up of this relay causes the picking up of relay 5E (see Fig. 1Q). This relay is picked up by the energization of a circuit extending from (+), including front contact 290 of relay 4E (see Fig. 1P), front contact 291 of relay 2TK, front contact 292 of the switch position indicator relay 2NK, back contact 293 of relay 5W, wire 294, and upper winding of relay 5E, to (—). This relay when picked up is maintained energized by a stick circuit which is fed by back contacts 295, 296 and 297 of relays 3TK, 3NK and 7E, respectively, through front contact 298 of relay 5E, wire 299, back contact 293 of relay 5W, wire 294, and upper winding of relay 5E. This relay when picked up causes the dropping away of relay 4E by opening its stick circuit at back contact 248 (see Fig. 1L), but the relay 4E is slow enough in dropping away to remain picked up until the indicator bank 5K has had time to become operated in accordance with the identity stored in the indicator bank 4K.

In response to the picking up of the track indicator relay 2TK as has been described, the relay EW becomes dropped away by the opening of its circuit at back contact 240 of relay 2TK (see Fig. 1P), and the relay EW in turn causes the dropping away of the transfer relay 3–4TN (see Fig. 1F) by the opening of front contact 253.

The principal function of relay EW is to count a second train into the same block when both trains occupy the same block at the same time.

After the relay 3–4TN has become dropped away subsequent to the transfer of the identity from the indicator 3CK to the indicator 4CK, indicator 3CK is operated to a blank position. The circuit by which indicator 3CK is operated to a blank position extends from (BX), including back contact 277 of relay 2–3TN (see Fig. 1J), back contact 278 of relay 3W, back contact 279 of relay 3R, wire 280, back contact 281 of relay 3E, front contact 282 of relay 3–4TN, wire 283, back contact 284 of indicator 3CK, rectifier 230, latch winding 231, motor M of indicator 3CK, wire 232, back contact 285 of relay 3E, back contact 286 of relay 3–4TN, back contact 286a of relay 2ATK, wire 287, back contact 288 of relay 3W, and back contact 289 of relay 2–3TN, to (NX).

Relay 3–4TN when dropped away closes a circuit for the energization of relay 4–5TN to operate the indicators of the indicator bank 5K. Thus, relay 4–5TN becomes picked up by the energization of a circuit extending from (+), including back contact 300 of relay 3–4TN, front contact 301 of relay 2TK, wire 302, back contact 303 of relay 5–7TN, wire 304, and winding of relay 4–5TN, to (−).

This relay when picked up causes the indicator 5CK, for example, to be operated to display a 6 as the last digit of the identity number, by energization of motor circuits comparable to those that have been heretofore considered for other indicators. A mark is applied from front contact 256 of indicator 4CK, for example, to energize the motor of the indicator 5CK by the energization of a circuit extending from (BX), including back contact 305 of relay 5W, front contact 306 of relay 2NK, front contact 307 of relay 4–5TN, front contact 308 of relay 4E, front contact 256 of indicator 4CK, front contact 309 of relay 4–5TN, front contact 310 of relay 2NK, wire 311, back contact 312 of indicator 5CK, rectifier 313, latch winding 314, motor M of indicator 5CK, wire 315, back contact 316 of relay 5W, front contact 317 of relay 2NK, front contact 318 of relay 4–5TN, and front contact 319 of relay 4E, to (NX). The indicator 5CK continues to operate until its contacts are operated in correspondence with the contacts of the indicator 4CK.

With reference to Fig. 6D, after the eastbound train has left the detector track section 2T, the track indication relay 2TK at the control office becomes dropped away, and it in turn causes the dropping away of the transfer relay 4–5TN (see Fig. 1F) by the opening of its front contact 301.

Relay 4–5TN in dropping away closes a blanking circuit for the indicator 4CK and similar blanking circuits (not shown) are closed for the blanking of the indicators associated with the first and second digits of the identity number in the indicator bank 4K. The circuit by which the indicator 4CK is operated to a blank position extends from (BX), including back contact 320 of relay 3–4TN (see Fig. 1K), back contact 321 of relay 4W, back contact 322 of relay 4R, back contact 323 of relay 4E, back contact 324 of relay 4–5TN, wire 325, back contact 326 of indicator 4CK, rectifier 263, latch winding 264, motor M of indicator 4CK, wire 265, back contact 266 of relay 4W, back contact 267 of relay 3–4TN, back contact 327 of relay 4E and back contact 328 of relay 4–5TN, to (NX). Thus, the indicator bank 4K is operated to blank and the condition of the indicator assumes that illustrated in Fig. 6D with the identity number being set up only in the indicator 5K.

With reference to Fig. 6E, when an eastbound train enters the detector track section 3T at the right-hand end of the passing siding, transfer is made of the identity storage in the indicator bank 5K to the indicator bank 7K. Upon the picking up of the occupancy indication relay 3TK upon entrance of a train into the track section 3T, relay 7E (see Fig. 1R) becomes picked up. The circuit by which relay 7E is picked up at this time extends from (+), including front contact 329 of relay 5E, front contact 330 of relay 3NK, front contact 331 of relay 3TK, back contact 332 of relay EW1, back contact 333 of relay 7W, wire 334, and upper winding of relay 7E, to (−). At the same time, the transfer relay 5–7TN is picked up by the energization of a circuit extending from (+), including back contact 335 of relay 7–8TN (see Fig. 1H), wire 336, front contact 337 of relay 3TK, wire 338, back contact 339 of relay 4–5TN, wire 340, and winding of relay 5–7TN, to (−).

When the relays 5–7TN and 7E have become picked up, the operation of the respective indicators of the indicator bank 7K becomes effective to transfer the identity number. Thus, the indicator 7CK for the last digit of the number is operated to display the No. 6 in accordance with reading the code out of the indicator 5CK. In reading this code out, it may be assumed that the motor M of the indicator 7CK becomes energized in accordance with the application of a mark through front contact 312 of relay 5CK. The circuit by which the motor M of indicator 7CK becomes energized at this time extends from (BX), including front contact 341 of relay 5E (see Fig. 1L), front contact 342 of relay 3NK, back contact 343 of relay 7W, front contact 344 of relay 5–7TN, front contact 345 of relay 3NK, wire 346, front contact 312 of indicator 5CK, front contact 347 of the normal switch indication relay 3NK, front contact 348 of relay 5–7TN, back contact 349 of indicator 7CK, rectifier 350, latch winding 351, motor M of indicator 7CK, wire 352, back contact 353 of relay 7W, front contact 354 of relay 5–7TN, front contact 355 of relay 3NK, and front contact 356 of relay 5E, to (NX). Thus, the indicator 7CK is driven until its contacts are operated to positions in correspondence with the indicator 5CK.

The picking up of relay 7E removes energy from the relay 5E so as to cause this relay to be dropped away upon the opening of back contact 297 (see Fig. 1R). The relay 5E, however, is slow to drop away and thus there is time for the indicator 7CK to become positioned before the front contacts of relay 5E are opened.

With reference to Fig. 6F, when the eastbound train leaves the detector track section 3T associated with the right-hand end of the passing siding, the identity storage in the indicator bank 7K is transferred to the indicator bank 8K, and the indicators of the bank 5K are operated to blanking positions.

Upon the dropping away of the track indication relay 3TK when the detector track section becomes unoccupied, the relay EW1 (see Fig. 1Q) becomes picked up. The circuit by which relay EW1 is energized extends from (+), including back contact 357 of relay 8E, back contact 358 of relay 3ATK, front contact 359 of relay 7E, wire 360, back contact 361 of relay 3TK and winding of relay EW1, to (−). Upon the picking up of relay EW1, relay 8E (see Fig. 1R) becomes picked up by the energization of a circuit extending from (+), including back contact 362 of relay 3TK (see Fig. 1Q), front contact 363 of relay EW1, wire 364, front contact 365 of relay 7E, back contact 366 of relay 8W, and upper winding of relay 8E, to (−). This relay when picked up is maintained energized by a stick circuit extending from (+), including back contact 369 of relay 3ATK, back contact 368 of relay 3ATKP, front contact 367 of relay 8E, back contact 366 of relay 8W, and winding of relay 8E, to (−). The picking up of relay 8E opens a stick circuit for relay 7E at back contact 370 to cause relay 7E to become dropped away. The stick circuit by which relay 7E has been maintained energized extends from (+), including back contacts 370 and 371 of relays 8E and EW1 connected in multiple, front contact 372 of relay 7E, wire 373, back contact 333 of relay 7W, wire 334, and upper winding of relay 7E, to (−).

Also in response to the dropping away of the track indication relay 3TK upon the detector track section at the right-hand end of the passing siding becoming unoccupied, the relay 5–7TN is dropped away by the opening of its circuit at front contact 337 (see Fig. 1G). Upon the dropping away of relay 5–7TN, the indicators of the bank 5K become operated to a blank indicating position, indicator 5CK being operated to blank by the energization of a circuit extending from (BX), including back contact 374 of relay 4–5TN (see Fig. 1K), back contact 375 of relay 5W, wire 376, back contact 520 of relay 5R, back contact 377 of relay 5E, back contact 378 of relay 5–7TN, back contact 379 of indicator 5CK, rectifier 313, latch winding 314, motor M of indicator 5CK, wire 315, back contact 380 of relay 5E, back contact 381 of relay 5–7TN, wire 382, back contact 383 of relay 5W, and back contact 384 of relay 4–5TN, to (NX).

Transfer relay 7–8TN becomes picked up upon the dropping away of the transfer relay 5–7TN by the energization of a circuit extending from (+), including back contact 385 of relay 5–7TN (see Fig. 1G), front contact 386 of relay EW1, wire 387, front contact 521 of relay 7E, winding of relay 7–8TN, and back contact 388 of relay 8–9TN, to (−).

Relay 7–8TN when picked up causes the transfer of the train identity from the indicator bank 7K to the indicator bank 8K. Thus, the indicator 8CK, for example, becomes operated into correspondence with the position of the indicator 7CK, and in accordance with the assumed No. 6 having been set up in the indicator 7CK, one of the circuits for the energization of the indicator 8CK extends from (BX), including back contact 389 (see Fig. 1G) of relay 5E, front contact 390 of relay 3NK, front contact 391 of relay 5–7TN, front contact 392 of relay 7W, front contact 349 of indicator 7CK, wire 393, front contact 394 of relay 7–8TN, back contact 395 of indicator 8CK, rectifier 396, latch winding 397, motor M of indicator 8CK, wire 398, back contact 399 of relay 8W, front contact 400 of relay 7–8TN, and front contact 401 of relay 7E, to (NX).

Relay 7–8TN becomes dropped away upon the opening of its circuit at front contact 521 of relay 7E, and when dropped away it closes a circuit for the blanking of the indicators of the bank 7K, the indicator 7CK (see Fig. 1G) being operated to blank by a circuit extending from (BX), including back contact 402 of relay 7–8TN, back contact 403 of relay 7E, wire 404, back contact 405 of relay 7R, back contact 406 of relay 7W, back contact 407 of relay 5–7TN, wire 408, back contact 409 of indicator 7CK, rectifier 350, latch winding 351, motor M of indicator 7CK, wire 352, back contact 353 of relay 7W, back contact 354 of relay 5–7TN, wire 410, back contact 411 of relay 7E, and back contact 412 of relay 7–8TN, to (NX).

When an eastbound train progresses to the point, as illustrated in Fig. 6G, of entrance into the track section 3AT, the relay 3ATK becomes picked up, and the picking up of this relay causes the dropping away of relay 8E by opening its circuit at back contact 369 (see Fig. 1R).

The track indication repeater relay 3ATKP (see Fig. 1M) becomes picked up in response to the picking up of the track indication relay 3ATK upon the closure of front contact 413, and when picked up is maintained energized by a stick circuit extending from (+), including front contact 414 of relay 8E, front contact 415 of relay 3ATKP, and lower winding of relay 3ATKP, to (−).

To consider the final cancellation of the identity storage upon passage of an eastbound train, it will be assumed that an eastbound train leaves track section 3AT as is illustrated in Fig. 6H wherein the track indication relay 3ATK is actuated to its dropped away position. Upon the dropping away of relay 3ATK, the indicators of the indicator bank 8K are operated to blank positions.

The circuit by which indicator 8CK, for example, is operated to a blank position extends from (BX), including back contact 416 of relay 8–9TN (see Fig. 1M), back contact 417 of relay 8E, back contact 418 of relay 8R, back contact 419 of relay 8W, wire 420, back contact 421 of relay 7–8TN, back contact 422 of indicator 8CK, rectifier 396, latch winding 397, motor M of indicator 8CK, wire 398, back contact 399 of relay 8W, back contact 400 of relay 7–8TN, back contact 423 of relay 3ATK, back contact 424 of relay 8E, and back contact 425 of relay 8–9TN, to (NX).

Having thus described in detail the mode of operation in the transfer of identity numbers for the passage of an eastbound train, it is to be understood that a similar mode of operation is effective for the control of the same indicators in accordance with the passage of a westbound train.

It is further provided that identity transfer is selected by switch indication relays so that transfer is made selectively to either the indicator bank 5K or the indicator bank 6K in accordance with whether the track switch associated with the passing siding that is being approached by a train is operated to its normal or reverse position respectively. Thus, the control of the indicator bank 5K has been described as being selected through front contacts of the normal switch repeater relay 2NK for the passage of an eastbound train (see Fig. 1F). One circuit that has been described for operation of indicator 5CK has been described as extending through front contact 310 of the normal switch position indicator relay 2NK. It should be readily apparent that if back contact 310 of the relay 2NK is closed rather than the front contact, transfer is made to the indicator 6CK rather than to the indicator 5CK through circuits comparable to those that have been described in detail relative to transfer to the indicator 5CK.

*Switching moves*

It is further provided that, following the same general mode of operation that has been described, switching moves can be made wherein an eastbound train, for example, can leave part of its train on the main track within the ends of the passing sidings and proceed through the detector track section 3T, reverse its direction of operation and back into the siding, pull out of the siding and back through the track switch 3W in its normal position, and pick up the balance of the train on the main track and proceed to complete an eastbound train movement through the track layout. For this switching operation, the direction is established in advance of the trains, and each time that the train moves through the detector track section 3T blanking becomes effective for the indicator from which train identity transfer has last been made. Inasmuch as the circuits involved are comparable to those that have been described in detail, it is believed unnecessary to describe all of these circuits, but consideration will be given to certain special circuits that are used in connection with the swtiching operation.

If it is assumed that an eastbound train has left part of its train on the main track between ends of the passing siding and has proceeded through the detector track section 3T, the indicator bank 5K has been blanked in the rear of the train, and the train identity number has been set up in the indicator banks 7K and 8K as is illustrated in the diagram of Fig. 6F.

Under these conditions, the track indicator relay 3TK has been actuated to its dropped away position, the relays EW1 and 8E have been picked up and the relay 7E has been dropped away.

In setting up a route for the train to back into the passing siding, the operator of the centralized traffic control machine operates the switch lever 3SML (see Fig. 1Q) to its right-hand position to designate the reverse position for the track switch 3W, and the signal control lever 3SGL (see Fig. 1L) is operated to its left-hand position in accordance with the required clearing of a signal for governing passage of the train into the passing siding. After actuation of a start button (not shown) on the control machine, a change relay 3CH (see Fig. 1L) is picked up as a part of the conventional code communication apparatus provided in a centralized traffic control system. This relay 3CH when picked up causes the picking up of the relay 8W by the energization of a circuit extending from (+), including front contact 426 of relay 3CH (see Fig. 1L), lever 3SGL in its left-hand position, front contact 427 of relay EW1, wire 428, front contact 429 of relay 8E and winding of relay 8W, to (—). This relay when picked up is maintained energized by a stick circuit including front contact 430 of relay 8W and front contact 429 of relay 8E.

Relay E, however, is deenergized upon the picking up of relay 8W by the opening of its circuit at back contact 366 (see Fig. 1R.) Thus, the relay 8E becomes dropped away and the dropping away of that relay closes another stick circuit for relay 8W extending from (+), including back contact 448 of relay 7W (see Fig. 1L), wire 449, front contact 450 of relay 8W, back contact 429 of relay 8E, and upper winding of relay 8W, to (—).

With relay 8E in its dropped away position, a circuit is closed to cause the picking up of relay 7W extending from (+), including back contact 451 of relay 8E (see Fig. 1R), back contact 452 of relay 3ATK, front contact 453 of relay 8W, wire 454, front contact 455 of relay EW1, wire 456, back contact 432 of relay 7E, wire 433, and upper winding of relay 7W, to (—). This relay when picked up is maintained energized by a stick circuit extending from (+), including back contact 457 of relay 6W, wire 458, back contact 459 of relay 3NK, front contact 460 of relay 7W, wire 461, back contact 432 of relay 7E, wire 433, and upper winding of relay 7W, to (—). Relay 7W in picking up causes transfer from indicator bank 8K to indicator bank 7K and also causes the dropping away of relay 8W by the opening of its stick circuit at back contact 448 (see Fig. 1L). When relay 8W drops away, indicator bank 8K will be put to blank by front contact 522 of relay 8W dropping relay 7–8TN.

If it is now assumed that the train starts to enter the passing siding and thus enters the track section 3T, the track indication relay 3TK becomes picked up, and the picking up of that relay causes the dropping away of relay EW1 by the opening of its circuit at back contact 361 (see Fig. 1Q) and also picks up transfer relay 5–7TN. Relay 5–7TN becomes picked up at this time by the energization of a circuit extending from (+), including back contact 335 of relay 7–8TN (see Fig. 1H), wire 336, front contact 337 of relay 3TK, back contact 438 of the switch indication relay 3NK and winding of relay 5–7TN, to (—).

The picking up of relay 5–7TN, with the switch indication relay 3NK in its dropped away position, provides for the transfer of the train identity number from the indicator bank 7K to the indicator bank 6K which is associated with the passing siding. If it is assumed that the last digit of the identity number is 6 as has been heretofore considered, energy is applied for operating the motor of the indicator 6CK through a circuit extending from (BX), including back contact 439 of relay 6E (see Fig. 1G), back contact 390 of relay 3NK, front contact 391 of relay 5–7TN, front contact 392 of relay 7W, front contact 349 of indicator 7CK, wire 393, front contact 348 of relay 5–7TN, back contact 347 of relay 3NK, wire 440, back contact 441 of indicator 6CK, rectifier 442, latch winding 443, motor M of indicator 6CK, back contact 444 of relay 6E, back contact 445 of relay 3NK, front contact 446 of relay 5–7TN, and front contact 447 of relay 7W, to (NX).

Also in response to the picking up of the track indication relay 3TK, the relay 6W becomes picked up by the energization of a circuit extending from (+), including front contact 472 of relay 7W (see Fig. 1Q), front contact 473 of relay 3TK, back contact 474 of relay 3NK, back contact 470 of relay 6E, wire 471, and winding of relay 6W, to (—). This relay when picked up causes the dropping away of relay 7W by the opening of its circuit at back contact 457 (see Fig. 1K).

When the train passes out of the track section 3T in entering the passing siding, the track indication relay 3TK is dropped away, and the dropping away of this relay causes the dropping away of the transfer relay 5–7TN by the opening of its circuit at front contact 337 (see Fig. 1G). Upon the dropping away of the relay 5–7TN, the indicators of the indicator bank 7K are operated to blank positions. Thus, the indicator 7CK is operated to blank at this time by the energization of a circuit that has been described.

When the train gets ready to leave the passing siding, the operator sets up the route for the train by actuating his signal control lever 3SGL (see Fig. 1L) to its right-hand position, and upon the picking up of the relay 3CH, the relay 6E becomes picked up by the energization of a circuit extending from (+), including front contact 462 of the CTC start relay 3CH, contact 463 of signal lever 3SGL in its right-hand position, switch control lever 3SML in its right-hand position, wire 464, front contact 465 of relay 6W, wire 466, and winding of relay 6E, to (—). Stick energy is applied to this circuit through front contact 467 when relay 6E becomes picked up.

The picking up of relay 6E causes the dropping away of relay 6W by the opening of its circuit at back contact 470. Relay 6W is normally slow to drop away because of the charged condenser C1 being applied through front contact 479 across the lower winding of relay 6W. This shunting effect, however, is obtained only provided that the back contact 480 of relay 6E is closed, and under the present situation, the relay 6E has been picked up and thus the shunting circuit for the lower winding of relay 6W is not effective, and the relay 6W becomes dropped away.

If it is assumed now that the train enters the track section 3T upon leaving the passing siding, the indicator relay 3TK becomes picked up, and the picking up of this relay causes the picking up of the transfer relay 5–7TN (see Fig. 1G) by the energization of a circuit that has been described through front contact 337 of relay 3TK. The picking up of relay 5–7TN causes transfer of the train identity from the indicator bank 6K to the indicator bank 7K as selected by the switch indication relay 3NK. Thus, the motor circuit of indicator 7CK is closed in accordance with the transfer being made for the assumed identity No. 6 extending from (BX), including front contact 475 of relay 6E, back contact 342 of relay 3NK, back contact 343 of relay 7W, front contact 344 of relay 5–7TN, back contact 345 of relay 3NK, front contact 441 of indicator 6CK, wire 440, back contact 347 of relay 3NK, front contact 348 of relay 5–7TN, back contact 349 of indicator 7CK, rectifier 350, latch winding 351, motor M of indicator 7CK, wire 352, back contact 353 of relay 7W, front contact 354 of relay 5–7TN, back contact 355 of relay 3NK, and front contact 477 of relay 6E, to (NX).

Also upon the occupancy of the detector track section 3T, relay 7E (see Fig. 1R) becomes picked up by the energization of a circuit extending from (+), including front contact 478 of relay 6E (see Fig. 1Q), back contact 330 of relay 3NK, front contact 331 of relay 3TK, back contact 332 of relay EW1, back contact 333 of relay 7W, wire 334, and winding of relay 7E, to (—).

Relay 6E becomes deenergized upon the picking up of relay 7E by the opening of a stick circuit which extends from (+), including back contact 481 of relay 7E (see Fig. 1R), wire 482, front contact 483 of relay 6E, wire 484, back contact 465 of relay 6W, wire 466, and upper winding of relay 6E, to (—).

When the track section 3T becomes unoccupied in the rear of the train, the track indication relay 3TK is dropped away and the dropping away of this relay causes the picking up of relay EW1 by the energization of a circuit that has been described.

Relay 5–7TN is dropped away upon the dropping away of relay 3TK by the opening of its circuit at front contact 337 (see Fig. 1G) and upon the dropping away of relay 5–7TN, relay 7–8TN becomes picked up by the energization of a circuit that has been described to cause the operation of the indicator bank 8K to set up the identity corresponding to that of the indicator bank 7K. The operation of the indicator bank 8K is similar to a mode of operation that has been heretofore described.

Relay 5–7TN when dropped away causes blanking to become effective for the indicator bank 6K that is associated with the passing siding. Thus the indicator 6CK (see Fig. 1L), for example, has energy applied for operation to a blanking position from (BX), including back contact 489 of relay 4–5TN, back contact 490 of relay 6W, wire 491, back contact 492 of relay 6E, back contact 493 of relay 6R, back contact 494 of relay 5–7TN, back contact 495 of indicator 6CK, rectifier 442, latch winding 443, motor M of indicator 6CK, back contact 444 of relay 6E, back contact 496 of relay 5–7TN, wire 497, back contact 498 of relay 5W, and back contact 499 of relay 4–5TN, to (NX).

It can be assumed that the blanking of the indicators of the indicator banks 7K and 8K becomes effective in the same manner as has been heretofore described when considering the mode of operation upon passage of a through eastbound train.

*Auxiliary indicator control*

It is further provided that it is possible for an operator to change the identification number that is set up in any one of the indicators without requiring the identification number to be first set up in the indicator at one end of the track diagram and then transferred. Thus, if it is desirable, for example, to change the number that is set up in the indicator bank 4K, the operator first actuates the lever 4RL (see Fig. 1B) to its right-hand position and he then proceeds to designate the respective digits of the number that is to be set up in the indicator bank 4K.

The actuation of the lever 4RL to its right-hand position causes the picking up of relay 4R and also causes the energization of relay 1R1. Relay 1R1 is picked up at this time by the energization of a circuit extending from (+), including lever 4RL in its right-hand position, front contact 500 of relay 4R, back contacts 501, 502, 503 and 504 of relays 5R, 6R, 7R and 8R, respectively, and winding of relay 1R1, to (−).

In order that the code wires of the master indicator MK may be connected to the auxiliary buses, the transfer relay 2TN must first be picked up (see Fig. 1L). The circuit for the energization of relay 2TN under these conditions, extends from (+), including front contact 177 of relay 1R, back contact 178 of relay Z, wire 179, front contact 514 of relay 1R1, wire 182, and winding of relay 2TN, to (−).

Relay 1R1 when picked up disconnects the indicators of the master indicator bank MK (see Fig. 1D) from the wires by which the identity is normally automatically transferred out of the master indicator bank to either the indicator bank 2K or the indicator bank 9K, and connects the master indicator to buses shown at the top of Figs. 1E to 1H inclusive from which a selected indicator can be positioned, the selection of the indicator having been made by the manual designation of the particular indicator banks into which the identity number is to be transferred. Thus, if it is assumed that the indicator bank 4K has been designated as the bank to receive the new identity number, the indicator 4CK (see Fig. 1F) of that indicator bank has connections made to its code wires so that it becomes operated into correspondence with the identity number that is set up for the corresponding last digit of the master indicator bank as is stored by the master indicator MCK of Fig. 1D. Transfer to this indicator includes the picking up of a direction relay 4E or 4W in accordance with whether the identity number designated is odd or even as indicating whether the identity is for an eastbound or a westbound train. If the number is assumed to be the number 256, because of the number being even, the east relay 4E (see Fig. 1K) is picked up by the energization of its lower winding by a circuit extending from (+), including front contact 505 of relay 1R1 (see Fig. 1P), wire 506, front contact 507 of relay 1R, back contact 508 of relay Z, wire 509, back contact 510 of relay OE, even bus 511, front contact 512 of relay 4R, wire 513, and lower winding of relay 4E, to (−).

In reading the number 256 out of the master indicator bank MK and into the indicator bank 4K, the indicator 4CK for the last digit of the number is operated in accordance with the energization of read-out circuits applied to the master indicator MCK. A typical circuit by which the indicator 4CK has its motor energized to drive in correspondence with the master indicator MCK extends from (BX), including front contact 515 of relay 1R1, front contact 143 of indicator MCK, front contact 202 of relay 1R1, front contact 516 of relay 2TN, wire 517, front contact 418 of relay 4R, back contact 256 of indicator 4CK, rectifier 263, latch winding 264, motor M of indicator 4CK, wire 265, front contact 523 of relay 4R, wire 524, and back contact 525 of relay Z, to (NX).

After the indicator 4CK has had time to complete its operation, the operator of the CTC control machine restores the lever 4RL (see Fig. 1B) to its left-hand position and the relays 4R, 1R1 and 2TN become dropped away. The picking up of the direction relay 4E as has been described conditions the system so that the newly set up number in the indicator bank 4K is automatically transferred as the corresponding eastbound train progresses. This transfer is of course according to the general mode of operation of the system that has been described.

In case a description storage is fed into the indicator storage bank at either end of the diagram when a train proceeding in the opposite direction is within the block adjoining that end, special means is provided to prevent the transfer of the description in the end indicator bank until the description of the opposing train has been cancelled.

Relays 2ATKP and 3ATKP are used for this purpose to hold a description storage set up in respective end indicator banks 2K and 9K upon passage of a train in the opposite direction, until the description of the train passing in the opposite direction has been cancelled.

If the description for an approaching westbound train, for example, is stored in indicator bank 9K before an eastbound train has left the block east of the passing siding, the relay 8W (see Fig. 1M) cannot be picked up to permit transfer into the indicator bank 8K because relay 8E (see Fig. 1R) is in its picked up position at this time due to the presence of the eastbound train in the block. Upon the picking up of relay 3ATKP, when the approach track section 3AT becomes occupied by the eastbound train, a stick circuit is established for relay 8E extending from (+), including front contact 369 of relay 3ATK (see Fig. 1R), front contact 526 of relay 9W, front contact 367 of relay 8E, back contact 366 of relay 8W, and upper winding of relay 8E, to (−).

When the eastbound train passes out of the track section 3AT, the dropping away of the track indication relay 3ATK causes the indicator bank 8K to be operated to blank, and the above described stick circuit for the relay 8E is opened upon the opening of front contact 369. Relay 3ATKP is maintained energized, however, through front contact 414 of relay 8E (see Fig. 1M) until the relay 8E is dropped away, and therefore the stick circuit that has been heretofore described for the relay 8E including back contact 368 of relay 3ATKP (see Fig. 1R) is open at this time. When relay 8E becomes dropped away, the relay 3ATKP becomes dropped away and the system is conditioned so that the entrance of a westbound train into the track section 3AT is effective to cause relay 8W to be picked up and thus to cause the transfer of the description storage for the westbound train from the indicator bank 9K to the indicator bank 8K.

Having thus described a posting indicator control system as applied to a typical centralized traffic control machine, it is to be understood that this form has been selected to facilitate the disclosure of the invention relative to the principles involved rather than to limit the number of forms that the present invention may assume, and various modifications, adaptations and alterations may be applied to the specific form shown in accordance with the requirements of practice without departing from the spirit or scope of the present invention.

What we claim is:

1. In a traffic control system for a stretch of railway track, a diagram of the trackway for which the system is provided, several power driven posting indicators disposed successively along the trackway of the track diagram, each of the posting indicators being operable to selectively display different indicia for identification of respective trains, means for setting up the identification of respective trains entering the stretch of track at either end in the respective posting indicators belonging to the associated ends of the diagram, and means governed by the passage of a train in either direction through various track sections in the stretch of track for advancing the train identification storage through the same indicators from indicator to indicator as the train progresses, irrespective of the direction of traffic.

2. In a traffic control system for a stretch of railway track, a diagram of the trackway for which the system is provided, several power driven posting indicators disposed successively along the trackway of the track diagram and a master posting indicator, each of the posting indicators being operable to selectively display different indicia for identification of respective trains, means for setting up in said master indicator the identification respectively of trains entering said stretch of track from either end, and means for automatically transferring the identification for the respective trains from the master indicator to the indicators at the respective ends of the diagram selectively in accordance with the direction of traffic of the associated trains.

3. In a system for controlling traffic over a stretch of single railway track, a diagram of the stretch of track at a control office, several posting indicators spaced successively along the trackway of the diagram, means for setting up the identity of respective trains entering the stretch of track in the posting indicator belonging to the entering end of the track diagram, transfer and traffic direction relays for the respective intermediate indicators, and means including said transfer and said traffic direction relays and governed by the passage of a train through the stretch of track in either direction for transferring identity of the train through the same indicators from indicator to indicator successively corresponding to the progress of the train, whereby the same posting indicators are used for both directions of traffic.

4. In a system for the control of traffic over a stretch of single railway track, a diagram of the stretch of track at a control office, several posting indicators disposed successively along the trackway of the diagram and a master posting indicator, means for setting up the identities of trains approaching the stretch of track in said master indicator, automatic selecting means distinctively responsive in accordance with whether the identity set up in said master indicator is an odd or even number, and transfer means for transferring identities set up in the master posting indicator to an indicator belonging to one end of the diagram or the other selectively in accordance with the condition of said automatic selecting means.

5. In a system for the control of traffic over a stretch of railway track, a diagram of the trackway for which the system is provided, code responsive posting indicators disposed successively along the trackway of the diagram, each of the posting indicators being operable to selectively display different indicia for identification of respective trains, means for setting up the identification of respective trains entering the stretch of track in a posting indicator adjoining the corresponding entrance point in the track diagram, and code transfer means including code buses connecting the indicators successively for transfer from indicator to indicator of different train identities, said code transfer means being governed by the passage of a train to automatically advance the train identification from indicator to indicator over said code buses as the train progresses.

6. In a traffic control system for a stretch of railway track, a diagram of the trackway at a control office, several power driven posting indicators disposed successively along the trackway of the track diagram, each of the posting indicators being operable to selectively display train identity of respective trains and a blank condition by different indicia, means for setting up identity of respective trains entering the stretch of track in the posting indicator belonging to the entering end of the track diagram, means governed by the passage of a train through the stretch of track for transferring the identity belonging to that train from indicator to indicator as the train progresses, and blanking means effective to automatically operate each indicator to a blank indicating position subsequent to the transfer of train identity from that indicator to another indicator.

7. In a system for the control of traffic over a stretch of railway track, a diagram of the trackway at a control office, several banks of posting indicators spaced successively along the track diagram, each of the banks of indicators being operable to selectively display different multiple digit train identity indicia, means for initially setting up the identity of respective trains entering the stretch of track in the posting indicator bank belonging to that end of the track diagram, means governed by the passage of a train through the stretch of track for transferring the identity belonging to that train from indicator bank to indicator bank as the train progresses, and blanking means effective to automatically operate the indicators of each of the indicator banks to blank indicating positions subsequent to the transferring of train identity from that indicator bank to another indicator bank.

8. In a traffic control system for a stretch of railway track, a diagram of the trackway for which the system is provided, several power driven posting indicators disposed successively along the trackway of the track diagram, each of the posting indicators being operable to selectively display different indicia for identity of respective trains, and each of said posting indicators being operable to a blank indicating position, means for setting up identity of respective trains entering the stretch of track at either end in the respective posting indicators belonging to the associated ends of the diagram, means governed by the passage of a train in either direction through the stretch of track for transferring the identity belonging to that train through the same posting indicators from indicator to indicator as the train progresses, and blanking means effective to automatically operate each indicator to a blank indicating position upon transfer of train identity from the associated indicator to another indicator.

9. In a posting indicator control system for operating a posting indicator in response to a code having several digits, a posting indicator having an indicating tape and having a code control wire for each of the code digits, said indicator tape having respective different indicia and a plurality of blank indicating spaces, circuit means effective in response to energization of a particular one of said code wires associated with a particular code digit for operating said indicator to the next blank indicating position on said tape, and means responsive to the selective energization of said other code wires with said one code wire deenergized for operating said tape selectively to positions displaying the different indicia in accordance with the code applied.

10. In a system for the control of traffic over a stretch of railway track, a diagram of the trackway at a control office, several code responsive posting indicators disposed successively along the trackway of the diagram, each of the posting indicators being operable to selectively display different indicia for identification of respective trains and being operable to at least one blank indicating position, means for setting up identity of respective trains entering the stretch of track in the posting indicator belonging to the entering end on the track diagram, code transfer means connecting the indicators successively by a number of code wires corresponding to the number of different digits of an indicator control code, said code transfer means being governed by the passage of a train to automatically advance the train identification from indicator to indicator as the train progresses, and blanking means effective to operate each indicator to a blank indicating position subsequent to the transfer of train identity from that indicator to another indicator.

11. In a posting indicator control system for operating a posting indicator in response to a code having several digits, a posting indicator having an indicating tape and having a code control wire for each of the code digits, said indicator tape having several different indicia respectively spaced by single blank spaces, circuit means effective in response to energization of only a particular one of said code wires associated with a particular code digit when said indicator is displaying any one of said indicia for operating said indicator only one indicating position to the next indicating position which is blank, and means responsive to the selective energization of said other code control wires with said code control wire deenergized for operating said tape selectively to positions displaying the different indicia in accordance with the codes applied.

12. In a posting indicator control system, a posting indicator bank comprising one indicator for each digit of a multiple digit number, a bank of keys comprising respective keys for several different single digit numbers and including a key for 0, means responsive to successive actuation of the keys of said bank for operating different indicators of said posting indicator bank in response to the respective sequential operations of said keys to indicating positions in correspondence with numbers with which the respective keys that have been actuated are associated, said means being effective to cause an indicator when operated in response to the actuation of said key for 0 designation to display 0 indicia when a number other than 0 has been designated for a preceding digit, and said means being effective to cause an indicator when operated in response to the actuation of said key for 0 designation to be operated to a blank indicating position if there has been no number other than 0 designated for a preceding digit.

13. In a system for the control of traffic over a stretch of railway track, a diagram of the trackway for which the system is provided, posting indicators spaced successively along the track diagram, each of the posting indicators being operable to selectively display different indicia for identification of respective trains, means for setting up the identification of respective trains entering the stretch of track in a posting indicator adjoining the corresponding entrance point in the track diagram, means governed by the passage of a train through the various track sections in the stretch of track for advancing the train identification from indicator to indicator successively as the train progresses, and manually controlled means for changing a train identification for an intermediate one of said indicators without requiring the new identity to be transferred from said indicator belonging to an entrance point.

14. In a control system for a bank of indicators, manually operable means for designation of different indicia, code storage relay means distinctively responsive to the actuation of said manually operable means, sequencing means operable to count the successive designations of said manually operable means, a bank of code responsive posting indicators having one indicator for each digit of an identity designated by successive actuations of said manually operable means, and means including said sequencing means and said code storage relay means and a set of code buses for each indicator for actuating said code responsive indicators successively for different digits of an identity that has been designated.

15. In a posting indicator control system, a bank of keys for designation of respective indicia to be displayed by indicators, code storage relay means distinctively responsive to the actuation of different keys of said bank, sequencing means operable to count the successive designations by selective actuation of the keys of said bank, a bank of code responsive posting indicators having one indicator for each digit of an identity designated by successive actuations of said keys, and means including said sequencing means and said code storage relay means and code buses for each of the indicators for actuating said indicators successively for different digits of a designated identity.

References Cited in the file of this patent

UNITED STATES PATENTS

| | | |
|---|---|---|
| 2,206,550 | Mordin | July 2, 1940 |
| 2,334,333 | Kiner | Nov. 16, 1943 |
| 2,350,620 | Judge | June 6, 1944 |
| 2,378,294 | Field | June 12, 1945 |
| 2,425,973 | Wight | Aug. 19, 1947 |
| 2,439,862 | Preston | Apr. 20, 1948 |
| 2,481,780 | Preston | Sept. 13, 1949 |
| 2,588,930 | Kendall | Mar. 11, 1952 |
| 2,700,728 | Brixner | Jan. 25, 1955 |
| 2,731,632 | Field et al. | Jan. 17, 1956 |

FOREIGN PATENTS

| | | |
|---|---|---|
| 21,549/29 | Australia | July 10, 1930 |